US011829776B2

(12) United States Patent
Chang et al.

(10) Patent No.: US 11,829,776 B2
(45) Date of Patent: Nov. 28, 2023

(54) INTEGRATED CIRCUIT DEVICE THAT INCLUDES A PROTECTED MEMORY COMPONENT FOR TRANSMITTING PROTECTED DATA OVER A COMMUNICATION INTERFACE

(71) Applicant: Flexiworld Technologies, Inc., Vancouver, WA (US)

(72) Inventors: William Ho Chang, Vancouver, WA (US); Vinaynathan Viswanathan, Pune (IN)

(73) Assignee: Flexiworld Technologies, Inc., Vancouver, WA (US)

( * ) Notice: Subject to any disclaimer, the term of this patent is extended or adjusted under 35 U.S.C. 154(b) by 275 days.

(21) Appl. No.: 15/042,044

(22) Filed: Feb. 11, 2016

(65) Prior Publication Data
US 2016/0174068 A1 Jun. 16, 2016

Related U.S. Application Data

(63) Continuation of application No. 14/833,961, filed on Aug. 24, 2015, now abandoned, which is a
(Continued)

(51) Int. Cl.
*G06F 21/60* (2013.01)
*G06F 9/445* (2018.01)
(Continued)

(52) U.S. Cl.
CPC ............ *G06F 9/445* (2013.01); *G06F 21/602* (2013.01); *G06F 21/79* (2013.01); *H04L 63/061* (2013.01);
(Continued)

(58) Field of Classification Search
CPC ........ G06F 21/78; G06F 21/79; H04W 12/02; H04W 12/06
See application file for complete search history.

(56) References Cited

U.S. PATENT DOCUMENTS 5,166,809 A 11/1992 Surbrook
5,220,674 A 6/1993 Morgan et al.
(Continued)

FOREIGN PATENT DOCUMENTS

CN 1345497 A 4/2002
DE 19846452 A1 12/1999
(Continued)

OTHER PUBLICATIONS

United States Patent and Trademark Office, Office Action for U.S. Appl. No. 10/734,481, dated Sep. 28, 2016, 20 pages.
(Continued)

*Primary Examiner* — Zachary A. Davis
(74) *Attorney, Agent, or Firm* — Chernoff, Vilhauer, McClung & Stenzel, LLP

(57) ABSTRACT

An integrated circuit device that includes a secure or protected memory component is herein disclosed and enabled. The integrated circuit may be a wireless communication device or a smart card or an USB device. Additionally, the integrated circuit may be part of or in a computing device or mobile device. The integrated circuit device includes a private memory section for storing protected data that is not accessible by a user at the private memory section, but is accessible by a memory controller included in the integrated circuit device. The memory controller accesses the protected data with a combination of security operations that may include cryptography. The integrated circuit device may further include a wireless component for establishing a wireless connection with wireless computing devices or readers for wirelessly transmitting the protected data
(Continued)

accessed by the memory controller to the wireless computing devices.

20 Claims, 13 Drawing Sheets

Related U.S. Application Data continuation of application No. 14/089,622, filed on Nov. 25, 2013, now Pat. No. 9,116,723, which is a continuation of application No. 12/891,594, filed on Sep. 27, 2010, now Pat. No. 8,595,717, which is a continuation of application No. 10/823,513, filed on Apr. 12, 2004, now Pat. No. 7,805,720, and a continuation-in-part of application No. 10/734,481, filed on Dec. 12, 2003, now Pat. No. 11,467,856.

(60) Provisional application No. 60/462,080, filed on Apr. 11, 2003, provisional application No. 60/433,196, filed on Dec. 12, 2002.

(51) Int. Cl.
*G06F 21/79* (2013.01)
*H04W 12/069* (2021.01)
*H04L 9/40* (2022.01)
*H04W 84/18* (2009.01)

(52) U.S. Cl.
CPC ...... *H04L 63/0853* (2013.01); *H04L 63/0876* (2013.01); *H04W 12/069* (2021.01); *H04L 63/0823* (2013.01); *H04W 84/18* (2013.01)

(56) References Cited

U.S. PATENT DOCUMENTS

| | | | |
|---|---|---|---|
| 5,287,194 A | 2/1994 | Lobiondo | |
| 5,337,258 A | 8/1994 | Dennis | |
| 5,404,433 A | 4/1995 | Hosogai | |
| 5,412,798 A | 5/1995 | Garney | |
| 5,519,641 A | 5/1996 | Beers et al. | |
| 5,564,109 A | 10/1996 | Snyder et al. | |
| 5,580,177 A | 12/1996 | Gase et al. | |
| 5,596,697 A | 1/1997 | Foster et al. | |
| 5,604,843 A | 2/1997 | Shaw et al. | |
| 5,613,123 A | 3/1997 | Tsang et al. | |
| 5,619,250 A | 4/1997 | McClellan et al. | |
| 5,619,649 A | 4/1997 | Kovnat et al. | |
| 5,699,495 A | 12/1997 | Snipp | |
| 5,705,781 A | 1/1998 | Habedank et al. | |
| 5,708,780 A | 1/1998 | Levergood et al. | |
| 5,761,480 A | 6/1998 | Fukada et al. | |
| 5,796,442 A | 8/1998 | Gove et al. | |
| 5,815,194 A | 9/1998 | Ueda | |
| 5,832,191 A | 11/1998 | Thorne | |
| 5,867,633 A | 2/1999 | Taylor, III et al. | |
| 5,911,044 A | 6/1999 | Lo et al. | |
| 5,926,104 A | 7/1999 | Robinson | |
| 5,926,624 A | 7/1999 | Katz et al. | |
| 5,933,498 A | 8/1999 | Schneck et al. | |
| 5,940,843 A | 8/1999 | Zucknovich et al. | |
| 5,974,312 A | 10/1999 | Hayes, Jr. et al. | |
| 5,982,520 A | 11/1999 | Weiser et al. | |
| 5,987,454 A | 11/1999 | Hobbs | |
| 6,009,464 A | 12/1999 | Hamilton | |
| 6,020,973 A | 2/2000 | Levine et al. | |
| 6,037,981 A | 3/2000 | Wilson et al. | |
| 6,043,898 A | 3/2000 | Jacobs | |
| 6,044,428 A | 3/2000 | Rayabhari | |
| 6,046,820 A | 4/2000 | Konishi | |
| 6,061,452 A | 5/2000 | Suzuki | |
| 6,070,185 A | 5/2000 | Anupam et al. | |
| 6,091,956 A | 7/2000 | Hollenberg | |
| 6,119,153 A | 9/2000 | Dujari et al. | |
| 6,138,178 A | 10/2000 | Watanabe | |
| 6,141,659 A | 10/2000 | Barker et al. | |
| 6,148,081 A | 11/2000 | Szymanski et al. | |
| 6,148,346 A | 11/2000 | Hanson | |
| 6,157,809 A | 12/2000 | Kambayashi | |
| 6,167,514 A | 12/2000 | Matsui et al. | |
| 6,169,789 B1 | 1/2001 | Rao et al. | |
| 6,202,023 B1 | 3/2001 | Hancock et al. | |
| 6,205,429 B1 | 3/2001 | Peng | |
| 6,216,183 B1 | 4/2001 | Rawlins | |
| 6,225,993 B1 | 5/2001 | Lindblad et al. | |
| 6,233,611 B1 | 5/2001 | Ludtke et al. | |
| 6,246,486 B1 | 6/2001 | Takahashi | |
| 6,251,014 B1 | 6/2001 | Stockdale et al. | |
| 6,256,666 B1 | 7/2001 | Singhal | |
| 6,263,387 B1 | 7/2001 | Chrabaszcz | |
| 6,263,392 B1 | 7/2001 | McCauley | |
| 6,279,153 B1 | 8/2001 | Bi et al. | |
| 6,282,710 B1 | 8/2001 | Boehler | |
| 6,285,889 B1 | 9/2001 | Nykänen et al. | |
| 6,288,790 B1 | 9/2001 | Yellepeddy et al. | |
| 6,324,521 B1 | 11/2001 | Shiota et al. | |
| 6,330,611 B1 | 12/2001 | Itoh et al. | |
| 6,339,706 B1 | 1/2002 | Tillgren et al. | |
| 6,353,928 B1 | 3/2002 | Altberg et al. | |
| 6,360,364 B1 | 3/2002 | Chen et al. | |
| 6,363,452 B1 | 3/2002 | Lach | |
| 6,366,912 B1 | 4/2002 | Wallent et al. | |
| 6,366,965 B1 | 4/2002 | Binford et al. | |
| 6,366,966 B1 | 4/2002 | Aney et al. | |
| 6,370,686 B1 | 4/2002 | Delo et al. | |
| 6,379,058 B1 | 4/2002 | Petteruti et al. | |
| 6,389,010 B1 | 5/2002 | Kubler et al. | |
| 6,389,159 B2 | 5/2002 | Gilman et al. | |
| 6,396,531 B1 | 5/2002 | Gerszberg et al. | |
| 6,405,362 B1 | 6/2002 | Shih et al. | |
| 6,418,439 B1 | 7/2002 | Papierniak et al. | |
| 6,418,554 B1 | 7/2002 | Delo et al. | |
| 6,421,748 B1 | 7/2002 | Lin et al. | |
| 6,426,798 B1 | 7/2002 | Yeung | |
| 6,434,535 B1 | 8/2002 | Kupka et al. | |
| 6,449,052 B1 | 9/2002 | Sherer et al. | |
| 6,452,692 B1 | 9/2002 | Yacoub | |
| 6,453,127 B2 | 9/2002 | Wood et al. | |
| 6,473,800 B1 | 10/2002 | Jerger et al. | |
| 6,477,575 B1 | 11/2002 | Koeppel et al. | |
| 6,480,292 B1 | 11/2002 | Sugiyama | |
| 6,484,219 B1 | 11/2002 | Dunn et al. | |
| 6,487,587 B1 | 11/2002 | Dubey | |
| 6,487,599 B1 | 11/2002 | Smith et al. | |
| 6,493,104 B1 | 12/2002 | Cromer et al. | |
| 6,496,802 B1 | 12/2002 | van Zoest et al. | |
| 6,532,368 B1 | 3/2003 | Hild et al. | |
| 6,545,722 B1 | 4/2003 | Schultheiss et al. | |
| 6,546,387 B1 | 4/2003 | Triggs | |
| 6,546,419 B1 | 4/2003 | Humpleman et al. | |
| 6,550,008 B1 * | 4/2003 | Zhang ................ | H04L 63/04 348/E5.004 |
| 6,553,431 B1 | 4/2003 | Yamamoto et al. | |
| 6,556,313 B1 | 4/2003 | Chang et al. | |
| 6,529,522 B1 | 5/2003 | Ito et al. | |
| 6,560,651 B2 | 5/2003 | Katz et al. | |
| 6,584,903 B2 | 7/2003 | Jacobs | |
| 6,590,588 B2 | 7/2003 | Lincke et al. | |
| 6,594,723 B1 | 7/2003 | Chapman et al. | |
| 6,600,569 B1 | 7/2003 | Osada et al. | |
| 6,601,093 B1 | 7/2003 | Peters | |
| 6,603,744 B2 | 8/2003 | Mizutani et al. | |
| 6,604,135 B1 | 8/2003 | Rogers et al. | |
| 6,604,140 B1 | 8/2003 | Beck et al. | |
| 6,607,314 B1 | 8/2003 | McCannon et al. | |
| 6,608,928 B1 | 8/2003 | Queiroz | |
| 6,611,812 B2 | 8/2003 | Hurtado et al. | |
| 6,615,404 B1 | 9/2003 | Garfunkel et al. | |
| 6,622,018 B1 | 9/2003 | Erekson | |
| 6,623,527 B1 | 9/2003 | Hamzy | |
| 6,625,472 B1 | 9/2003 | Farazmandnia et al. | |
| 6,625,761 B1 | 9/2003 | Sartore et al. | |

(56) References Cited

U.S. PATENT DOCUMENTS

| | | |
|---|---|---|
| 6,628,417 B1 | 9/2003 | Naito et al. |
| 6,633,395 B1 | 10/2003 | Tuchitoi et al. |
| 6,636,929 B1 | 10/2003 | Frantz et al. |
| 6,654,135 B2 | 11/2003 | Mitani |
| 6,658,625 B1 | 12/2003 | Allen |
| 6,662,224 B1 | 12/2003 | Angwin et al. |
| 6,671,068 B1 | 12/2003 | Chang et al. |
| 6,678,751 B1 | 1/2004 | Hays et al. |
| 6,694,371 B1 | 2/2004 | Sanai |
| 6,697,848 B2 | 2/2004 | Hamilton et al. |
| 6,701,009 B1 | 3/2004 | Makoto et al. |
| 6,705,781 B2 | 3/2004 | Iwazaki |
| 6,732,179 B1 | 5/2004 | Brown et al. |
| 6,735,766 B1 | 5/2004 | Chamberlain et al. |
| 6,735,768 B1 | 5/2004 | Tanaka |
| 6,745,229 B1 | 6/2004 | Gobin et al. |
| 6,745,255 B2 | 6/2004 | Yen et al. |
| 6,751,732 B2 | 6/2004 | Strobel et al. |
| 6,753,978 B1 | 6/2004 | Chang |
| 6,757,070 B1 | 6/2004 | Lin et al. |
| 6,757,783 B2 | 6/2004 | Koh |
| 6,760,745 B1 | 7/2004 | Tan et al. |
| 6,772,233 B2 | 8/2004 | Iida et al. |
| 6,785,727 B1 | 8/2004 | Yamazaki |
| 6,788,428 B1 | 9/2004 | Shimokawa |
| 6,798,530 B1 | 9/2004 | Buckley et al. |
| 6,826,632 B1 | 11/2004 | Wugofski |
| 6,829,672 B1 | 12/2004 | Deng et al. |
| 6,830,340 B2 | 12/2004 | Olson et al. |
| 6,839,771 B1 | 1/2005 | Bouchier et al. |
| 6,840,441 B2 | 1/2005 | Monaghan et al. |
| 6,845,398 B1 | 1/2005 | Galensky et al. |
| 6,857,716 B1 | 2/2005 | Nagahashi |
| 6,859,228 B1 | 2/2005 | Chang et al. |
| 6,885,362 B2 | 4/2005 | Suomela |
| 6,889,058 B2 | 5/2005 | Tordera |
| 6,892,230 B1 | 5/2005 | Gu et al. |
| 6,895,444 B1 | 5/2005 | Weisshaar et al. |
| 6,898,652 B2 | 5/2005 | Peters et al. |
| 6,910,068 B2 | 6/2005 | Zintel et al. |
| 6,922,725 B2 | 7/2005 | Lamming et al. |
| 6,941,014 B2 | 9/2005 | Lin et al. |
| 6,944,687 B2 | 9/2005 | Doragh et al. |
| 6,947,995 B2 | 9/2005 | Chang et al. |
| 6,948,165 B1 | 9/2005 | Luu et al. |
| 6,952,831 B1 | 10/2005 | Moore |
| 6,975,644 B2 | 12/2005 | Tordera et al. |
| 7,028,102 B1 | 4/2006 | Larsson et al. |
| 7,047,302 B1 | 5/2006 | Chatani et al. |
| 7,050,840 B2 | 5/2006 | Lin et al. |
| 7,054,296 B1 | 5/2006 | Sorrells et al. |
| 7,055,956 B2 | 6/2006 | Olson et al. |
| 7,055,965 B2 | 6/2006 | Koba |
| 7,069,578 B1 | 6/2006 | Prus et al. |
| 7,076,534 B1 | 7/2006 | Cleron et al. |
| 7,085,814 B1 | 8/2006 | Gandhi et al. |
| 7,099,304 B2 | 8/2006 | Liu et al. |
| 7,102,691 B2 | 9/2006 | Dischert et al. |
| 7,127,541 B2 | 10/2006 | Govindarajulu et al. |
| 7,136,914 B2 | 11/2006 | Motoyama |
| 7,143,408 B2 | 11/2006 | Anderson et al. |
| 7,149,726 B1 | 12/2006 | Ingle et al. |
| 7,149,834 B2 | 12/2006 | Peters et al. |
| 7,158,953 B1 | 1/2007 | DeMello et al. |
| 7,164,885 B2 | 1/2007 | Jonsson et al. |
| 7,174,535 B2 | 2/2007 | Wragge |
| 7,180,475 B2 | 2/2007 | Slobodin et al. |
| 7,230,939 B2 | 6/2007 | Toyoshima |
| 7,237,046 B2 | 6/2007 | Paley et al. |
| 7,239,346 B1 | 7/2007 | Priddy |
| 7,243,153 B2 | 7/2007 | McIntyre et al. |
| 7,260,390 B1 | 8/2007 | Skinner et al. |
| 7,269,668 B2 | 9/2007 | Redford et al. |
| 7,318,086 B2 | 1/2008 | Chang et al. |
| 7,345,347 B2 | 3/2008 | Ohkubo et al. |
| 7,353,416 B2 | 4/2008 | Jeansonne et al. |
| 7,355,732 B2 | 4/2008 | Yamaguchi |
| 7,356,347 B1 | 4/2008 | Kammer |
| 7,370,090 B2 | 5/2008 | Nakaoka et al. |
| 7,484,245 B1 | 1/2009 | Friedman et al. |
| 7,577,910 B1 | 8/2009 | Husemann et al. |
| 7,580,005 B1 | 8/2009 | Palin |
| 7,609,402 B2 | 10/2009 | Chang et al. |
| 7,630,721 B2 | 12/2009 | Ortiz |
| 7,644,018 B1 | 1/2010 | Yukie et al. |
| 7,704,147 B2 | 4/2010 | Quraishi et al. |
| RE41,416 E | 7/2010 | Liu et al. |
| 7,762,470 B2 * | 7/2010 | Finn ............. H04H 60/372 235/487 |
| RE41,487 E | 8/2010 | Liu et al. |
| RE41,532 E | 8/2010 | Liu et al. |
| RE41,689 E | 9/2010 | Liu et al. |
| 7,805,720 B2 | 9/2010 | Chang et al. |
| RE41,882 E | 10/2010 | Liu et al. |
| 7,908,401 B2 | 3/2011 | Chang |
| 7,941,541 B2 | 5/2011 | Chang et al. |
| 7,944,577 B2 | 5/2011 | Chang et al. |
| 7,953,818 B2 | 5/2011 | Chang et al. |
| RE42,725 E | 9/2011 | Chang et al. |
| RE42,828 E | 10/2011 | Liu et al. |
| 8,082,491 B1 | 12/2011 | Abdelaziz et al. |
| 8,082,572 B1 | 12/2011 | Tilford |
| RE43,181 E | 2/2012 | Liu et al. |
| 8,169,649 B2 | 5/2012 | Chang et al. |
| 8,184,324 B2 | 5/2012 | Chang et al. |
| 8,285,802 B2 | 10/2012 | Chang et al. |
| 8,296,757 B2 | 10/2012 | Chang et al. |
| 8,332,521 B2 | 12/2012 | Chang et al. |
| 8,533,352 B2 | 9/2013 | Chang |
| 8,595,717 B2 | 11/2013 | Chang et al. |
| 8,630,000 B2 | 1/2014 | Chang et al. |
| 8,705,097 B2 | 4/2014 | Chang et al. |
| 8,711,408 B2 | 4/2014 | Chang et al. |
| 8,812,398 B2 | 8/2014 | Kuhn et al. |
| 8,964,220 B2 | 2/2015 | Chang et al. |
| 8,972,610 B2 | 3/2015 | Chang |
| 8,989,064 B2 | 3/2015 | Chang et al. |
| 9,036,181 B2 | 5/2015 | Chang et al. |
| 9,037,088 B2 | 5/2015 | Chang et al. |
| 9,042,811 B2 | 5/2015 | Chang et al. |
| 9,043,482 B2 | 5/2015 | Chang |
| 9,069,510 B2 | 6/2015 | Chang et al. |
| 9,092,177 B2 | 7/2015 | Chang et al. |
| 9,110,622 B2 | 8/2015 | Chang et al. |
| 9,116,723 B2 | 8/2015 | Chang et al. |
| 9,164,718 B2 | 10/2015 | Chang et al. |
| 9,298,407 B2 | 3/2016 | Chang et al. |
| 9,383,956 B2 | 7/2016 | Chang et al. |
| 9,389,822 B2 | 7/2016 | Chang et al. |
| 9,798,516 B2 | 10/2017 | Chang et al. |
| RE46,637 E | 12/2017 | Liu et al. |
| 9,836,257 B2 | 12/2017 | Chang et al. |
| 9,836,259 B2 | 12/2017 | Chang et al. |
| 9,841,935 B2 | 12/2017 | Chang et al. |
| 9,965,233 B2 | 5/2018 | Chang et al. |
| 9,971,555 B2 | 5/2018 | Chang et al. |
| 10,037,178 B2 | 7/2018 | Chang et al. |
| 10,126,991 B2 | 11/2018 | Chang et al. |
| 10,133,527 B2 | 11/2018 | Chang et al. |
| 10,140,071 B2 | 11/2018 | Chang et al. |
| 10,140,072 B2 | 11/2018 | Chang et al. |
| 10,140,073 B2 | 11/2018 | Chang et al. |
| 10,152,285 B2 | 12/2018 | Chang et al. |
| 10,162,596 B2 | 12/2018 | Chang et al. |
| 10,261,739 B2 | 4/2019 | Chang et al. |
| 10,303,411 B2 | 5/2019 | Chang et al. |
| 10,346,114 B2 | 7/2019 | Chang et al. |
| 10,359,957 B2 * | 7/2019 | Chang ............. G06F 3/0679 |
| 10,387,087 B2 | 8/2019 | Chang et al. |
| 10,481,846 B2 | 11/2019 | Chang et al. |
| 10,481,847 B2 | 11/2019 | Chang et al. |
| 10,489,096 B2 | 11/2019 | Chang et al. |
| 10,592,201 B2 | 3/2020 | Chang et al. |
| 10,592,202 B2 | 3/2020 | Chang et al. |

(56) References Cited

U.S. PATENT DOCUMENTS

| | | |
|---|---|---|
| 10,606,535 B2 | 3/2020 | Chang et al. |
| 10,642,576 B2 | 5/2020 | Chang et al. |
| RE48,066 E | 6/2020 | Liu et al. |
| RE48,088 E | 7/2020 | Liu et al. |
| 10,740,066 B2 | 8/2020 | Chang et al. |
| 10,761,791 B2 | 9/2020 | Chang et al. |
| 10,768,871 B2 | 9/2020 | Chang et al. |
| 10,841,798 B2 | 11/2020 | Chang et al. |
| 10,846,031 B2 | 11/2020 | Chang et al. |
| 10,860,290 B2 | 12/2020 | Chang et al. |
| 10,866,773 B2 | 12/2020 | Chang et al. |
| 10,873,856 B2 | 12/2020 | Chang et al. |
| 10,915,296 B2 | 2/2021 | Chang et al. |
| 10,963,169 B2 * | 3/2021 | Chang .................. G06F 13/385 |
| 11,029,903 B2 | 6/2021 | Chang et al. |
| 11,096,056 B2 | 8/2021 | Chang et al. |
| 11,169,756 B2 | 11/2021 | Chang et al. |
| 11,204,729 B2 | 12/2021 | Chang et al. |
| 11,467,856 B2 | 10/2022 | Chang |
| 2001/0029531 A1 | 10/2001 | Ohta |
| 2001/0032254 A1 | 10/2001 | Hawkins |
| 2002/0002707 A1 | 1/2002 | Ekel et al. |
| 2002/0010756 A1 | 1/2002 | Oku |
| 2002/0012329 A1 | 1/2002 | Atkinson et al. |
| 2002/0013730 A1 | 1/2002 | Bigus |
| 2002/0026492 A1 | 2/2002 | Fujita |
| 2002/0032855 A1 | 3/2002 | Neves et al. |
| 2002/0049580 A1 | 4/2002 | Kutaragi et al. |
| 2002/0051200 A1 | 5/2002 | Chang et al. |
| 2002/0058499 A1 | 5/2002 | Ortiz |
| 2002/0065098 A1 | 5/2002 | Hosogaya |
| 2002/0065872 A1 | 5/2002 | Genske et al. |
| 2002/0078161 A1 | 6/2002 | Cheng |
| 2002/0078367 A1 | 6/2002 | Lang et al. |
| 2002/0081993 A1 | 6/2002 | Toyoshima |
| 2002/0083151 A1 | 6/2002 | Adams et al. |
| 2002/0083430 A1 | 6/2002 | Kusuda et al. |
| 2002/0091843 A1 | 7/2002 | Vaid |
| 2002/0097408 A1 | 7/2002 | Chang et al. |
| 2002/0097415 A1 | 7/2002 | Chang et al. |
| 2002/0097416 A1 | 7/2002 | Chang et al. |
| 2002/0097417 A1 | 7/2002 | Chang et al. |
| 2002/0097418 A1 | 7/2002 | Chang et al. |
| 2002/0097419 A1 | 7/2002 | Chang et al. |
| 2002/0097433 A1 | 7/2002 | Chang et al. |
| 2002/0101515 A1 | 8/2002 | Yoshida et al. |
| 2002/0108054 A1 | 8/2002 | Moore et al. |
| 2002/0145632 A1 | 10/2002 | Shmueli et al. |
| 2002/0147912 A1 | 10/2002 | Shmueli et al. |
| 2002/0169960 A1 | 11/2002 | Iguchi et al. |
| 2002/0174254 A1 | 11/2002 | Kita et al. |
| 2002/0178295 A1 | 11/2002 | Buczek et al. |
| 2003/0028481 A1 | 2/2003 | Flitcroft et al. |
| 2003/0028797 A1 | 2/2003 | Long et al. |
| 2003/0046447 A1 | 3/2003 | Kouperchliak et al. |
| 2003/0084256 A1 | 5/2003 | McKee |
| 2003/0087601 A1 | 5/2003 | Agam et al. |
| 2003/0110371 A1 | 6/2003 | Yang et al. |
| 2003/0110372 A1 | 6/2003 | Proudler |
| 2003/0112975 A1 | 6/2003 | Taiwanese |
| 2003/0120754 A1 | 6/2003 | Muto et al. |
| 2003/0122934 A1 | 7/2003 | Shiohara |
| 2003/0126298 A1 | 7/2003 | Redford et al. |
| 2003/0160993 A1 | 8/2003 | Kang |
| 2003/0161193 A1 | 8/2003 | Moran et al. |
| 2003/0182456 A1 | 9/2003 | Lin et al. |
| 2003/0196007 A1 | 10/2003 | Baron |
| 2003/0200372 A1 | 10/2003 | Doragh et al. |
| 2003/0208629 A1 | 11/2003 | Parkman |
| 2003/0225971 A1 | 12/2003 | Oishi et al. |
| 2004/0001088 A1 | 1/2004 | Stancil et al. |
| 2004/0006648 A9 | 1/2004 | Kita et al. |
| 2004/0015709 A1 | 1/2004 | Chen et al. |
| 2004/0024688 A1 | 2/2004 | Bi et al. |
| 2004/0057075 A1 | 3/2004 | Stewart et al. |
| 2004/0070379 A1 | 4/2004 | Koretsky et al. |
| 2004/0078708 A1 | 4/2004 | Li et al. |
| 2004/0095382 A1 | 5/2004 | Fisher et al. |
| 2004/0127254 A1 | 7/2004 | Chang |
| 2004/0177355 A1 | 9/2004 | Wragge |
| 2004/0193900 A1 | 9/2004 | Nair |
| 2004/0199909 A1 * | 10/2004 | Goodman .............. G06F 13/385 |
| | | 717/168 |
| 2004/0203694 A1 | 10/2004 | Wong et al. |
| 2005/0005149 A1 | 1/2005 | Hirota et al. |
| 2005/0005263 A1 | 1/2005 | Miyazaki |
| 2005/0014534 A1 | 1/2005 | Hareng et al. |
| 2005/0055690 A1 | 3/2005 | Cornillon et al. |
| 2005/0059380 A1 | 3/2005 | Tomita |
| 2005/0246436 A1 | 11/2005 | Day et al. |
| 2006/0080517 A1 | 4/2006 | Brown |
| 2006/0112414 A1 | 5/2006 | Konen et al. |
| 2006/0173980 A1 | 8/2006 | Kobayashi et al. |
| 2007/0038724 A1 * | 2/2007 | Toyoshima ......... H04L 12/2838 |
| | | 709/218 |
| 2007/0081486 A1 | 4/2007 | Koide |
| 2007/0240154 A1 | 10/2007 | Gerzymisch et al. |
| 2007/0288611 A1 | 12/2007 | Serceki et al. |
| 2008/0003947 A1 | 1/2008 | Morris |
| 2008/0049740 A1 | 2/2008 | Serceki et al. |
| 2008/0071935 A1 | 3/2008 | Ohta |
| 2008/0126628 A1 | 5/2008 | Mullis et al. |
| 2009/0048978 A1 | 2/2009 | Ginter et al. |
| 2009/0049307 A1 * | 2/2009 | Lin ....................... H04L 9/3234 |
| | | 713/185 |
| 2009/0182903 A1 | 7/2009 | Tordera |
| 2009/0198839 A1 | 8/2009 | Banerjee et al. |
| 2009/0210868 A1 | 8/2009 | Parthasarathy |
| 2010/0174631 A1 | 7/2010 | Tian et al. |
| 2010/0201996 A1 | 8/2010 | Chang et al. |
| 2010/0203824 A1 | 8/2010 | Chang et al. |
| 2010/0227550 A1 | 9/2010 | Chang et al. |
| 2011/0016280 A1 | 1/2011 | Chang et al. |
| 2011/0034150 A1 | 2/2011 | Chang et al. |
| 2011/0035682 A1 | 2/2011 | Chang et al. |
| 2011/0138378 A1 | 6/2011 | Chang et al. |
| 2011/0167166 A1 | 7/2011 | Chang |
| 2011/0167175 A1 | 7/2011 | Chang |
| 2011/0211226 A1 | 9/2011 | Chang et al. |
| 2011/0279829 A1 | 11/2011 | Chang et al. |
| 2011/0279863 A1 | 11/2011 | Chang et al. |
| 2012/0096451 A1 | 4/2012 | Tenbarge et al. |
| 2012/0230315 A1 | 9/2012 | Chang et al. |
| 2012/0258700 A1 | 10/2012 | Chang et al. |
| 2013/0095887 A1 | 4/2013 | Chang et al. |
| 2013/0103775 A1 | 4/2013 | Chang et al. |
| 2013/0104052 A1 | 4/2013 | Chang |
| 2013/0109353 A1 | 5/2013 | Chang et al. |
| 2013/0111459 A1 | 5/2013 | Nakamoto |
| 2014/0018130 A1 | 1/2014 | Chang |
| 2014/0082604 A1 | 3/2014 | Chang et al. |
| 2015/0356561 A1 | 12/2015 | Chang et al. |
| 2015/0356564 A1 | 12/2015 | Chang et al. |
| 2015/0363763 A1 | 12/2015 | Chang et al. |
| 2015/0381612 A1 * | 12/2015 | Chang ..................... G06F 21/79 |
| | | 713/156 |
| 2016/0011836 A1 | 1/2016 | Chang et al. |
| 2016/0174068 A1 | 6/2016 | Chang et al. |
| 2016/0239232 A1 * | 8/2016 | Chang .................... G06F 3/0656 |
| 2016/0239243 A1 | 8/2016 | Chang et al. |
| 2016/0313974 A1 | 10/2016 | Chang et al. |
| 2017/0039009 A1 | 2/2017 | Chang et al. |
| 2017/0064746 A1 | 3/2017 | Chang et al. |
| 2017/0075636 A1 | 3/2017 | Chang et al. |
| 2017/0078521 A1 | 3/2017 | Chang et al. |
| 2017/0185376 A1 | 6/2017 | Chang et al. |
| 2017/0228202 A1 | 8/2017 | Chang et al. |
| 2017/0242649 A1 | 8/2017 | Jarvis et al. |
| 2017/0249116 A1 | 8/2017 | Chang et al. |
| 2017/0277487 A1 | 9/2017 | Chang et al. |
| 2017/0286027 A1 | 10/2017 | Chang et al. |
| 2017/0364326 A1 | 12/2017 | Chang et al. |
| 2018/0011667 A1 | 1/2018 | Chang et al. |
| 2018/0024790 A1 | 1/2018 | Chang et al. |

(56) References Cited

U.S. PATENT DOCUMENTS

| | | |
|---|---|---|
| 2018/0024791 A1 | 1/2018 | Chang et al. |
| 2018/0039456 A1 | 2/2018 | Chang et al. |
| 2018/0039459 A1 | 2/2018 | Chang et al. |
| 2018/0041482 A1 | 2/2018 | Chang et al. |
| 2018/0046418 A1 | 2/2018 | Chang et al. |
| 2018/0203647 A1 | 7/2018 | Chang et al. |
| 2018/0203648 A1 | 7/2018 | Chang et al. |
| 2018/0253264 A1 | 9/2018 | Chang et al. |
| 2018/0335989 A1 | 11/2018 | Chang et al. |
| 2018/0364929 A9 | 12/2018 | Chang et al. |
| 2019/0107980 A1 | 4/2019 | Chang et al. |
| 2019/0121585 A1 | 4/2019 | Chang et al. |
| 2019/0121613 A1 | 4/2019 | Chang et al. |
| 2019/0250883 A1 | 8/2019 | Chang et al. |
| 2019/0272148 A1 | 9/2019 | Chang et al. |
| 2019/0303100 A1 | 10/2019 | Chang et al. |
| 2019/0361617 A1 | 11/2019 | Chang et al. |
| 2019/0384547 A1 | 12/2019 | Chang et al. |
| 2020/0097225 A1 | 3/2020 | Chang et al. |
| 2020/0225889 A1 | 7/2020 | Chang et al. |
| 2021/0055891 A1 | 2/2021 | Chang et al. |
| 2021/0165632 A1 | 6/2021 | Chang et al. |
| 2021/0303180 A1 | 9/2021 | Chang et al. |

FOREIGN PATENT DOCUMENTS

| | | |
|---|---|---|
| EP | 0473987 A1 | 3/1992 |
| EP | 1072976 A2 | 1/2001 |
| GB | 2357663 A | 6/2001 |
| WO | 9526703 A1 | 10/1995 |
| WO | 9843433 A1 | 10/1998 |
| WO | 0002358 A1 | 1/2000 |
| WO | 0006904 A1 | 2/2000 |
| WO | 0024192 A1 | 4/2000 |
| WO | 0044119 A1 | 7/2000 |
| WO | 0125870 A2 | 4/2001 |
| WO | 0142894 A1 | 6/2001 |
| WO | 0241118 A2 | 5/2002 |
| WO | 03015641 A1 | 2/2003 |
| WO | 2004093149 A2 | 10/2004 |

OTHER PUBLICATIONS

Dave Haynie, "The Zorro III Bus Specification: A General Purpose Expansion Bus for High Performance Amiga Computers," Vernal Equinox Release, Mar. 20, 1991, 60 pages.
Herman D'Hooge, "The Communicating PC," IEEE Communications Magazine, Apr. 1996, pp. 36-42.
Wiener et al. "Meeting USB and IEEE1394 overcurrent protection requirements using PolySwitch devices," IEEE Wescon/97 Conference Proceedings, Nov. 1997, pp. 442-475.
International Searching Authority, International Search Report in International application No. PCT/US01/48057, dated Jan. 6, 2003, 1 page.
International Preliminary Examination Authority, International Preliminary Examination Report in International application No. PCT/US01/48057, dated Aug. 24, 2004, 11 pages.
International Searching Authority, International Search Report in International application No. PCT/US03/39547, dated Jul. 15, 2005, 4 pages.
International Searching Authority, International Search Report in International application No. PCT/US04/11372, dated Jun. 20, 2007, 3 pages.
The International Bureau of WIPO, International Preliminary Report on Patentability in International application No. PCT/US2004/011372, dated Aug. 14, 2007, 8 pages.
State Intellectual Property Office of the P.R.C., Office action in Chinese Patent Application No. 200480016309.4, dated May 8, 2009, 10 pages.
European Patent Office, Office action in European Patent Application No. 01985549.3, dated Oct. 26, 2010, 4 pages.
State Intellectual Property Office of the P.R.C., Office action in Chinese Patent Application No. 200480016309.4, dated May 24, 2011, 11 pages.
State Intellectual Property Office of the P.R.C., Office action in Chinese Patent Application No. 200480016309.4, dated Oct. 28, 2011, 6 pages.
European Patent Office, Office action in European Patent Application No. 04759486.6, dated Dec. 23, 2011, 11 pages.
State Intellectual Property Office of the P.R.C., Office action in Chinese Patent Application No. 200480016309.4, dated Aug. 5, 2013, 18 pages.
Tony K.P. Wong, "An Embedded Chip for USB Application: from the Architecture to the Implementation," International IC '99 Conference Proceedings, 1999, pp. 1-10.
E.V. Vetvitskii et al., "Use of the USB Universal Serial Bus in Computer Medical Systems," Biomedical Engineering, 2000, pp. 167-172, vol. 34, No. 4.
M-SYSTEMS, "Mobile DiskOnChip Plus 32/64MByte, Flash Disk with Protection and Security-Enabling Features," 2002, 50 pages.
Ray Geroski, "Take your data anywhere with these four USB miniature storage devices," Sep. 23, 2002, 6 bages.
Ed Roth, "Storage in a Flash," Dec. 15, 2002, 4 pages.
Jon David, "Security in a Flash," 2003, 6 pages.
Jankovec et al., "Analog circuit development system," IEEE, 2003, pp. 125-129.
Terrence B. Remple, "Usb On-The-Go Interface for Portable Devices," IEEE, 2003, pp. 8-9.
Attiaoui et al. "Conception of Data Base Management System in USB Smart Card Flash Memory: Application for the Cancer Pathology of Medical Information Systems," SETIT 2005: 3rd International Conference: Sciences of Electronic Technologies of Information and Telecommunications, Mar. 27-31, 2005, pp. 1-7.
Tahir et al., "Analysis of AutoPlay Feature via the USB Flash Drives," Proceedings of the World Conference on Engineering WCE 2008, London, U.K., Jul. 2-4, 2008, pp. 1-4, vol. 1.
Jebarajan et al., "A Method for Designing an Operating System for Plug and Play Bootstrap Loader USB Drive," JCSI International Journal of Computer Science Issues, Jan. 2001, pp. 295-301, vol. 8, Issue 1.
U.S. Patent and Trademark Office, Office action in U.S. Appl. No. 10/734,481, dated Dec. 8, 2009, 40 pages.
U.S. Patent and Trademark Office, Office action in U.S. Appl. No. 10/823,513, dated Dec. 17, 2009, 32 pages.
U.S. Patent and Trademark Office, Notice of Allowance in U.S. Appl. No. 10/823,513, dated Jun. 1, 2010, 43 pages.
U.S. Patent and Trademark Office, Notice of Allowance in U.S. Appl. No. 10/734,484, dated Oct. 28, 2010, 57 pages.
U.S. Patent and Trademark Office, Office action in U.S. Appl. No. 10/734,481, dated Aug. 2, 2011, 68 pages.
U.S. Patent and Trademark Office, Office action in U.S. Appl. No. 13/047,672, dated Jan. 20, 2012, 58 pages.
U.S. Patent and Trademark Office, Office action in U.S. Appl. No. 13/047,674, dated Mar. 14, 2012, 38 pages.
U.S. Patent and Trademark Office, Office action in U.S. Appl. No. 10/734,481, dated Apr. 4, 2012, 83 pages.
U.S. Patent and Trademark Office, Notice of Allowance in U.S. Appl. No. 12/890,487, dated Jun. 20, 2012, 10 pages.
U.S. Patent and Trademark Office, Office action in U.S. Appl. No. 12/891,594, dated Jul. 5, 2012, 50 pages.
U.S. Patent and Trademark Office, Notice of Allowance in U.S. Appl. No. 13/047,674, dated Nov. 6, 2012, 21 pages.
European Patent Office, Office action in European Patent Application No. 04759486.6, dated Jan. 8, 2014, 14 pages.
European Patent Office, Office action in European Patent Application No. 04759486.6, dated Mar. 19, 2014, 3 pages.
State Intellectual Property Office of the P.R.C., Office action in Chinese Patent Application No. 200480016309.4, dated Apr. 3, 2014, 14 pages.
European Patent Office, Office action in European Patent Application No. 04759486.6, dated May 22, 2014, 43 pages.
State Intellectual Property Office of the P.R.C., Decision of Rejection in Chinese Patent Application No. 200480016309.4, dated Sep. 29, 2014, 17 pages.

(56) References Cited

OTHER PUBLICATIONS

U.S. Patent and Trademark Office, Office action in U.S. Appl. No. 10/823,513, dated Feb. 8, 2007, 60 pages.
U.S. Patent and Trademark Office, Office action in U.S. Appl. No. 10/823,513, dated Oct. 31, 2007, 26 pages.
U.S. Patent and Trademark Office, Office action in U.S. Appl. No. 10/734,481, dated Mar. 24, 2008, 33 pages.
U.S. Patent and Trademark Office, Office action in U.S. Appl. No. 10/734,484, dated Sep. 2, 2008, 44 pages.
U.S. Patent and Trademark Office, Office action in U.S. Appl. No. 10/823,513, dated Dec. 29, 2008, 28 pages.
U.S. Patent and Trademark Office, Office action in U.S. Appl. No. 10/734,481, dated Jan. 6, 2009, 43 pages.
U.S. Patent and Trademark Office, Office action in U.S. Appl. No. 13/047,672, dated Nov. 6, 2012, 33 pages.
U.S. Patent and Trademark Office, Office action in U.S. Appl. No. 10/734,481, dated Nov. 7, 2012, 86 pages.
U.S. Patent and Trademark Office, Notice of Allowance in U.S. Appl. No. 12/891,594, dated Jan. 18, 2013, 11 pages.
U.S. Patent and Trademark Office, Notice of Allowance in U.S. Appl. No. 13/047,674, dated Apr. 29, 2013, 15 pages.
U.S. Patent and Trademark Office, Notice of Allowance in U.S. Appl. No. 12/891,594, dated Jul. 22, 2013, 26 pages.
U.S. Patent and Trademark Office, Office action in U.S. Appl. No. 13/047,672, dated Aug. 1, 2013, 25 pages.
U.S. Patent and Trademark Office, Office action in U.S. Appl. No. 10/734,481, dated Sep. 10, 2013, 28 pages.
U.S. Patent and Trademark Office, Office action in U.S. Appl. No. 14/021,974, dated Nov. 22, 2013, 21 pages.
U.S. Patent and Trademark Office, Notice of Allowance in U.S. Appl. No. 13/047,672, dated Dec. 24, 2013, 21 pages.
U.S. Patent and Trademark Office, Office action in U.S. Appl. No. 10/734,481, dated Apr. 3, 2014, 22 pages.
U.S. Patent and Trademark Office, Office action in U.S. Appl. No. 14/021,974, dated May 16, 2014, 47 pages.
U.S. Patent and Trademark Office, Office action in U.S. Appl. No. 13/047,672, dated Jun. 25, 2014, 30 pages.
U.S. Patent and Trademark Office, Notice of Allowance in U.S. Appl. No. 10/734,481, dated Aug. 27, 2014, 23 pages.
U.S. Patent and Trademark Office, Office action in U.S. Appl. No. 14/021,974, dated Sep. 9, 2014, 17 pages.
U.S. Patent and Trademark Office, Office action in U.S. Appl. No. 14/089,622, dated Oct. 6, 2014, 101 pages.
U.S. Patent and Trademark Office, Notice of Allowance in U.S. Appl. No. 13/047,672, dated Oct. 17, 2014, 33 pages.
U.S. Patent and Trademark Office, Notice of Allowance in U.S. Appl. No. 14/021,974, dated Dec. 19, 2014, 24 pages.
U.S. Patent and Trademark Office, Notice of Allowance in U.S. Appl. No. 10/734,481, dated Dec. 23, 2014, 15 pages.
U.S. Patent and Trademark Office, Notice of Allowance in U.S. Appl. No. 14/089,622, dated Mar. 24, 2015, 44 pages.
U.S. Patent and Trademark Office, Notice of Allowance in U.S. Appl. No. 10/734,481, dated Apr. 14, 2015, 18 pages.
U.S. Patent and Trademark Office, Supplemental Notice of Allowability in U.S. Appl. No. 14/089,622, dated Apr. 29, 2015, 16 pages.
U.S. Patent and Trademark Office, Office action in U.S. Appl. No. 10/734,481, dated Aug. 17, 2015, 19 pages.
U.S. Patent and Trademark Office, Office action in U.S. Appl. No. 10/734,481, dated Jan. 28, 2016, 33 pages.
United States Patent and Trademark Office, Office Action for U.S. Appl. No. 10/734,481, dated May 15, 2017, 98 pages.
Office Action prepared by the US Patent and Trademark Office for U.S. Appl. No. 15/042,051, dated Dec. 28, 2017, 68 pages.
Office Action prepared by the US Patent and Trademark Office for U.S. Appl. No. 15/042,051, dated Sep. 28, 2018, 14 pages.

Notice of Allowance prepared by the US Patent and Trademark Office for U.S. Appl. No. 15/042,051, dated Feb. 26, 2019, 68 pages.
Office Action prepared by the US Patent and Trademark Office for U.S. Appl. No. 16/518,727, dated May 15, 2020, 56 pages.
Notice of Allowance prepared by the US Patent and Trademark Office for U.S. Appl. No. 16/518,727, dated Nov. 6, 2020, 65 bages.
Corrected Notice of Allowability prepared by the US Patent and Trademark Office for U.S. Appl. No. 16/518,727, dated Mar. 1, 2021, 9 pages.
Office Action prepared by the US Patent and Trademark Office for U.S. Appl. No. 10/734,481, dated Feb. 14, 2018, 41 pages.
Office Action prepared by the US Patent and Trademark Office for U.S. Appl. No. 10/734,481, dated Feb. 21, 2019, 113 pages.
Office Action prepared by the US Patent and Trademark Office for U.S. Appl. No. 10/734,481, dated Oct. 10, 2019, 107 pages.
Office Action prepared by the US Patent and Trademark Office for U.S. Appl. No. 10/734,481, dated May 29, 2020, 93 pages.
Office Action prepared by the US Patent and Trademark Office for U.S. Appl. No. 10/734,481, dated Jan. 29, 2021, 31 pages.
Rigney, Steve, Print Servers (PC Magazine, Jan. 19, 1999), 8 pages.
Notice of Allowance prepared by the US Patent and Trademark Office for U.S. Appl. No. 10/734,481, dated Nov. 24, 2021, 46 pages.
Kindberg et al., "A Web Based Nomadic Computing System", HP Laboratories, Palo Alto, CA; Aug. 24, 2000, 14 pages.
Bluetooth, Core, "Specification of the Bluetooth System," Dec. 1, 1999, 1080 pages (attachments are in 4 parts).
"Part 11 Wireless LAN Medium Access Control (MAC) and Physical Layer (PHY) Specifications," ANSI/IEEE Std. 802.11, 1999 Edition, 528 pages (split into two documents).
Richard III, Golden G., "Service Advertisement and Discovery: Enabling Universal Device Cooperation" (IEEE Internet Computing Magazine, September/Oct. 2000), 9 pages.
Rigney, Steve, Print Servers (PC Magazine, Jan. 19, 1999), 12 pages.
Excerpts from Gerard O'Driscoll, The Essential Guide to Home Networking (Published 2000/ Reprinted 2001), 25 bages.
Axis Print Server Brochure (archived on Sep. 25, 2000, available at https://web.archive.org/web/20000925114525/http:/www.axis.com/ftp/pub/axis/data_sheets/npsds.pdf), 4 pages.
Excerpts from UPnP Forum Connections Newsletter, Third Quarter 2000 (archived on Aug. 16, 2000, available at https://web.archive.org/web/20000816073400/http://upnp.org/newsletter/default.htm, https://web.archive.org/web/20000818105427/http://www.upnp.org/newsletter/devtools.htm), 6 pages.
Excerpts from Bluetooth Core Specification v1.0 B (Dec. 1, 1999), 60 pages.
Excerpts from Roy Hoffman, Data Compression in Digital Systems (1997), 189 pages.
Excerpts from Michael Miller, The Complete Idiot's Guide to Home Theater Systems (2000), 58 pages.
Awduche, Daniel O. "On Resource Discovery Systems with Mobile Hosts" (1996), 6 pages.
IEEE Standard for Information Technology—Transport Independent Printer/System Interface (TIP/SI) (1997), 124 pages.
Macintosh PowerBook User's Manual (1998), 94 pages.
Setting Up Your PowerBook (2000), 80 pages.
Wright, "Design Goals for an Internet Printing Protocol," Apr. 1999, 43 pages.
United States Patent and Trademark Office, Notice of Allowance for U.S. Appl. No. 10/734,481 dated Nov. 24, 2021, 46 pages.
United States Patent and Trademark Office, Corrected Notice of Allowability for U.S. Appl. No. 10/734,481 dated Mar. 9, 2022, 6 pages.
United States Patent and Trademark Office, Notice of Allowance for U.S. Appl. No. 10/734,481 dated May 16, 2022, 6 pages.

\* cited by examiner

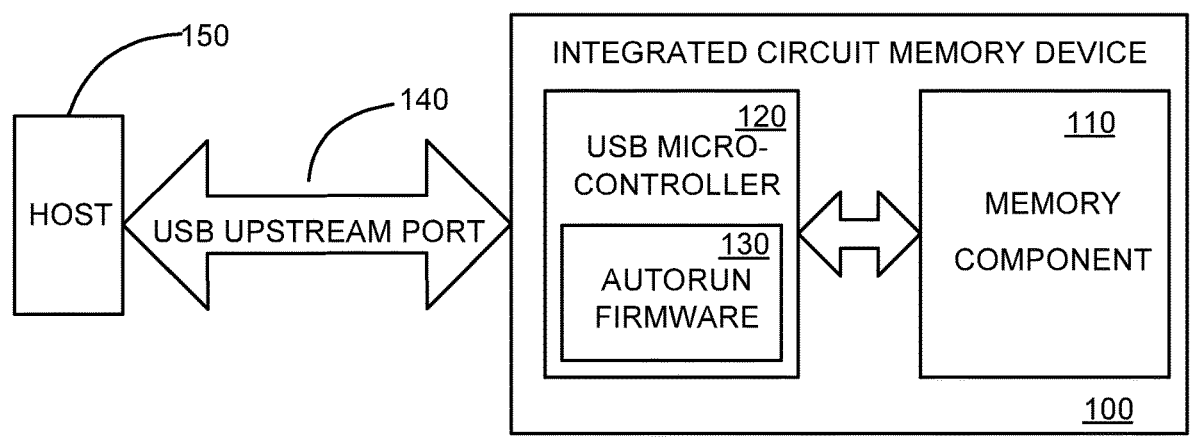
Fig. 1
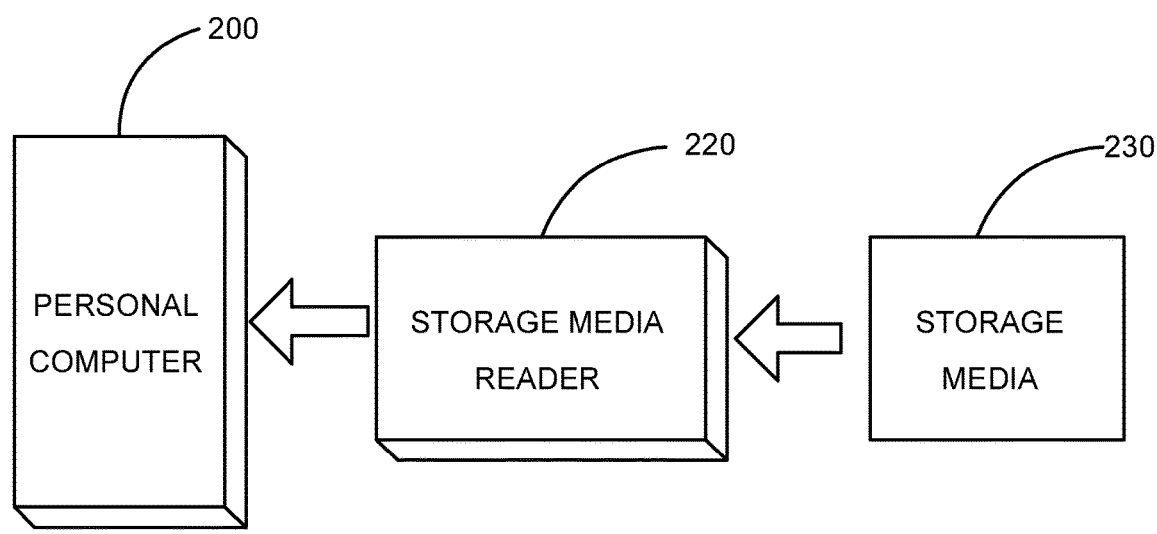
Fig. 2 – PRIOR ART

INTEGRATED CIRCUIT DEVICE THAT INCLUDES A PROTECTED MEMORY COMPONENT FOR TRANSMITTING PROTECTED DATA OVER A COMMUNICATION INTERFACE

CROSS-REFERENCES TO RELATED APPLICATIONS

This application is a continuation of U.S. patent application Ser. No. 14/833,961, filed on Aug. 24, 2015, which is a continuation of U.S. patent application Ser. No. 14/089,622, filed on Nov. 25, 2013, now U.S. Pat. No. 9,116,723, which is a continuation of U.S. patent application Ser. No. 12/891,594, filed on Sep. 27, 2010, now U.S. Pat. No. 8,595,717, which is (1) a continuation of U.S. patent application Ser. No. 10/823,513, filed on Apr. 12, 2004, now U.S. Pat. No. 7,805,720, which claims the benefit of U.S. Provisional Patent Application Serial No. 60/462,080, filed on Apr. 11, 2003; and (2) a continuation-in-part of U.S. patent application Ser. No. 10/734,481, filed on Dec. 12, 2003, which claims the benefit of U.S. Provisional Patent Application Serial No. 60/433,196, filed on Dec. 12, 2002. The complete disclosures of the above patent applications are hereby incorporated by reference for all purposes.

TECHNICAL FIELD

This invention relates to a system and method for utilizing storage media such as flash memory for achieving autorun of an application executable or installer stored on the storage media.

BACKGROUND OF THE INVENTION

As is known in the art, some applications such as software installers may be run automatically upon insertion of a CD-ROM disc into a CD-ROM drive, which may sometimes be called a dock or reader. In operation, this automatic running of an application is provided by an autorun feature that is stored on or incorporated into a CD-ROM drive dock/reader. Executables or installers stored on the CD-ROM disc are executed by the host personal computer based upon activation by the autorun feature in the CD-ROM drive dock/reader. In this implementation, the autorun feature is incorporated into the hardware drive/dock/reader, which is separate from the storage media.

SUMMARY OF THE INVENTION

Universal Serial Bus (USB) technology is rapidly gaining preference as the interfacing technology of choice for peripherals on computing devices such as personal or laptop computers. Flash memories coupled with a USB interface has have become convenient and portable storage devices that can replace floppy disks and compact disks (CDs).

However, the popular and widely-adopted Universal Serial Bus technology does not include distinct autorun features in the docks/readers. As a consequence, conventional integrated circuit memory devices such as USB memory devices do not have autorun functionality.

Accordingly, the present invention provides autorun functionality to any IC memory device, such as any USB peripheral, that has a memory component interfaced to a computing device interface microcontroller. The present invention provides autorun of one or more executables or application installers from a memory component with an interface to a computing device without an intermediate hardware-based autorun feature. As an example, such interface could be a USB interface and such computing device could be a personal computer.

For example, each USB peripheral device internally contains a USB microcontroller that performs the functionality associated with identifying the device to a host computing device, such as a personal computer. In accordance with the present invention, autorun firmware is embedded into the USB microcontroller. The autorun firmware enables autorun of an installable or executable application stored on the memory component of the USB device. The firmware acts as bridge components translating all commands and interactions between a host PC and the memory component.

Additional description and implementations of the present invention will be apparent from the detailed description of the preferred embodiment thereof, which proceeds with reference to the accompanying drawings.

BRIEF DESCRIPTIONS OF THE DRAWINGS

FIG. 1 illustrates an exemplary implementation of an autorun integrated circuit (IC) memory device according to the present invention.

FIG. 2 is a block diagram of a prior art arrangement in which a host personal computer includes an intermediate hardware dock that provides an autorun feature.

DETAILED DESCRIPTION OF PREFERRED EMBODIMENT

Figure 3:
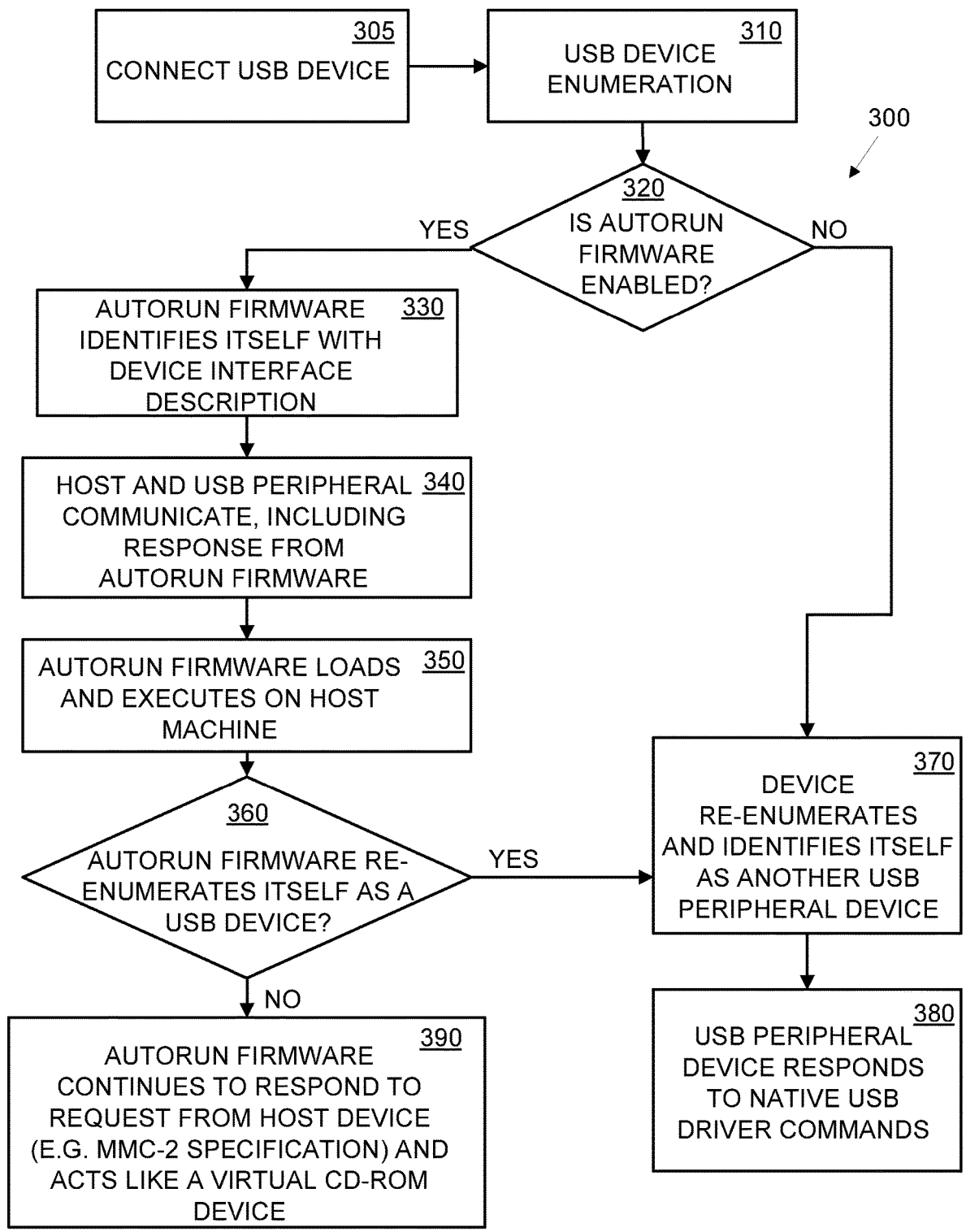
FIG. 3 is a flow diagram of an IC memory device autorun method.

FIG. 1 illustrates an exemplary implementation of an autorun integrated circuit (IC) memory device 100 according to the present invention. Autorun IC memory device may be in the form of a USB memory device, a compact flash card, a smart card, etc. For purposes of illustration, autorun IC memory device 100 will be described with reference to a universal serial bus (USB) memory device implementation.

Autorun IC memory device 100 includes a memory component 110 that communicates with a USB microcontroller 120 having autorun firmware 130 incorporated or embedded into microcontroller 120. Autorun IC memory device 100 includes an upstream port 140 for connecting to a host computing device 150 (e.g., personal or laptop computer, handheld computer, PDA, smart phone, etc., not shown). In the illustrated implementation, upstream port 140 is a USB port.

Autorun firmware 130 causes an application or executable stored in memory component 110 to be installed or run automatically upon activation of the IC memory device 100 vis-à-vis the host computing device 150. This activation may be achieved in a variety of ways including connecting or inserting the autorun IC memory device 100 into a docking system or port present on or interfaced to the host computing device 150. For example, IC memory device 100 with autorun firmware 130 incorporated into USB microcontroller 120 allows a "USB Flash Drive" storing one or more application executables or installables to be run automatically (i.e., autorun) upon activation, such as being plugged into the USB port of a host PC 150.

FIG. 2 is a block diagram of a prior art arrangement in which a host personal computer 200 includes an intermediate hardware dock 220 that provides an autorun feature for a storage medium like a CD-ROM 230. Intermediate hardware dock 220 functions as a storage media reader that may be internally integrated with or externally connected to the host personal computer 200 and the storage medium 230.

In this prior art implementation, insertion of a CD-ROM disc 230 into a CD-ROM dock/reader 220 may cause activation of an autorun feature that is stored on or incorporated into CD-ROM dock/reader 220. Executables or installers stored on the CD-ROM disc 230 may then be executed by the host personal computer 200 based upon activation by the autorun feature CD-ROM dock/reader 220.

As another example of such a prior art implementation, a flash memory card reader connected to a host computing device, such as a personal computer, may also include an autorun feature that can activate an executable or installer to run on the host computing device.

A disadvantage of such prior art implementations is that autorun features are incorporated into hardware docks or readers that are separate from the storage media. However, the popular and widely-adopted Universal Serial Bus technology does not include such distinct autorun features. As a consequence, conventional integrated circuit memory devices such as USB memory devices do not have autorun functionality. In contrast, the present invention provides autorun functionality to any IC memory device, such as any USB peripheral that has a memory component interfaced to a USB microcontroller.

FIG. 3 is a flow diagram of an IC memory device autorun method 300 that may be implemented from firmware 130 incorporated into a USB controller 120.

In step 305, a USB peripheral is inserted into or connected to a USB port of a host computing device (e.g., a personal computer).

In step 310, the host computing device performs an enumeration to identify the newly attached USB peripheral.

Step 320 is a query as to whether the USB peripheral includes autorun firmware that is enabled. If so, step 320 proceeds to step 330. If not, step 320 proceeds to step 370.

In step 330, the autorun firmware in the USB peripheral announces itself with a device interface description. For example, the device interface description may include Mass Storage Class, SCSI (Small Computer System Interface) transparent command set, Bulk Only Transport corresponding to a CD-ROM, for example.

In step 340, the host and the USB peripheral communicate with each other using, for example a standard MMC-2 (Mobile Module Connector 2) specification set. The communication includes a response to host commands from the autorun firmware according to the MMC-2 specification. As a part of the MMC-2 specification, the host requests enumeration of files in a root directory and the autorun firmware responds to the request.

In step 350, the autorun firmware informs the host of the presence of an autorun executable file to be executed and provides the file to the host. For example, the file may be named "Autorun.inf," which may be stored on the memory component of the USB peripheral. The host executes the autorun executable file to provide the autorun functionality.

Step 360 is a query whether the autorun firmware is to be enumerated again or "re-enumerated." If so, step 360 proceeds to step 370. If not, step 360 proceeds to step 390. Re-enumeration allows the autorun firmware to announce itself to the host as one or more other USB peripherals (e.g. data storage device, communication adapter, etc.) or, if there is no re-enumeration, the autorun firmware can continue to function as per MMC-2 specifications.

In step 370, the autorun firmware re-enumerates or identifies itself as another USB device, such as a USB flash drive or a USB wireless (e.g., Bluetooth, WiFi, IrDA) device or "dongle." With such a re-enumeration, the autorun firmware identifies itself with device interface descriptors for the other USB devices (e.g., USB flash drive or USB Bluetooth dongle).

In step 380, USB peripheral device responds to native USB driver commands, and the autorun firmware loads the firmware associated with the enumerated USB peripheral (e.g., USB flash drive or USB Bluetooth dongle).

In step 390, the autorun firmware is configured to not re-enumerate itself and continues to act as a virtual CD-ROM type device implementing the MMC-2 specifications.

Process steps 320, 330, 340, 350 and 360 correspond to the autorun firmware implementation. Step 390 provides for the implementation of a virtual mass storage device from a memory component that implements SCSI command sets and MMC-2specifications.

Figure 4A:
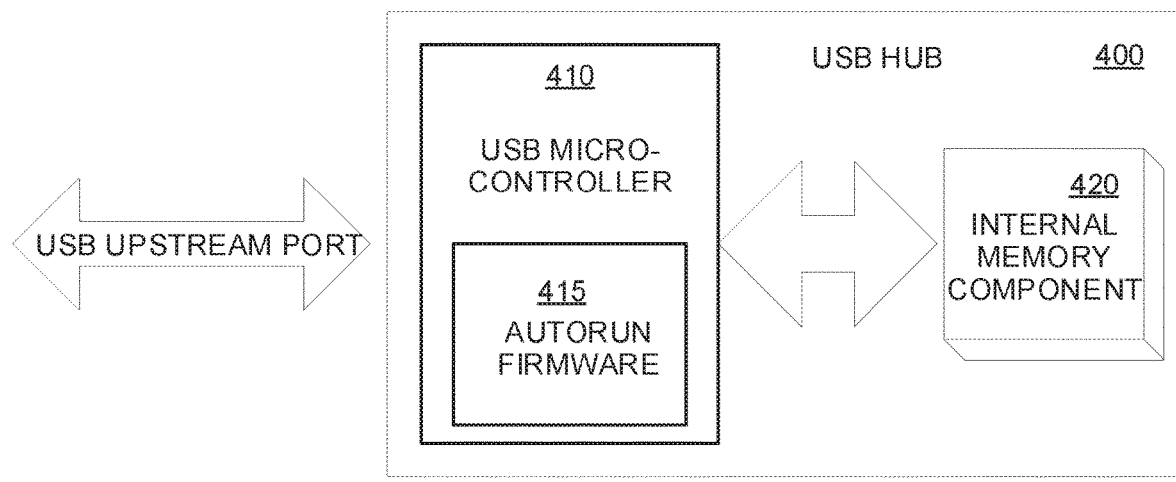
Figs. 4A and 4B illustrate autorun firmware according to the present invention embedded into alternative USB device configurations.
Figure 4B:
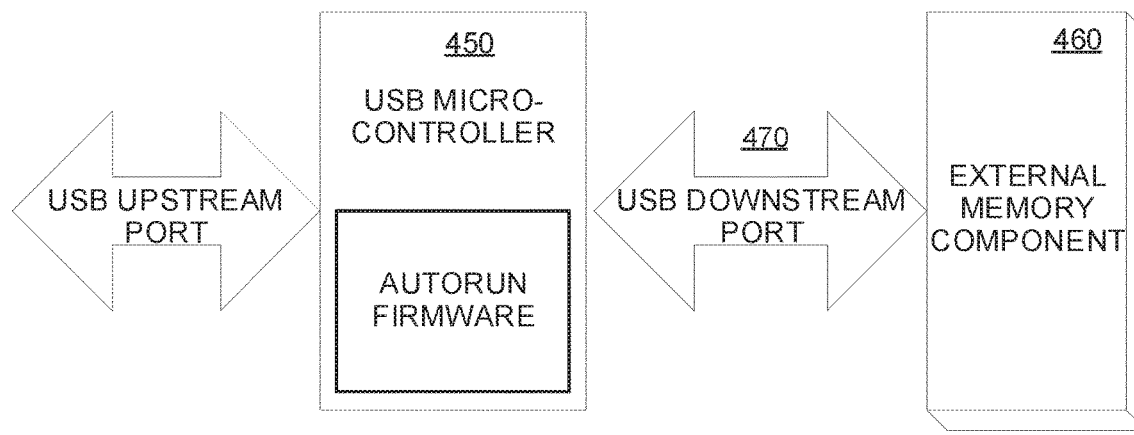

Autorun firmware according to the present invention can be embedded into multiple USB device configurations to provide a variety of unique USB peripherals with autorun functionality and into other peripheral devices with similar functionality. For example, FIG. 4A shows a USB hub 400 in which a USB microcontroller 410 with auto run firmware 415 communicates with an internal memory component 420. In FIG. 4B, a USB microcontroller 450 is connected to an external memory component 460 through a USB downstream port 470.

With reference to FIG. 4A, the USB microcontroller 410 that forms a part of the USB hub 400 typically is a repeater type entity allowing for cascaded multiple USB peripherals to connect through a single upstream port to a host system. The USB microcontroller 410 includes support for programming capability, which includes the autorun firmware 415. The Autorun firmware can then be ported to work on the USB microcontroller 410. The firmware may be stored on the internal memory component 420. Alternatively, the Autorun firmware may be stored on external memory 460 that is in an attached USB memory component.

Figure 5:
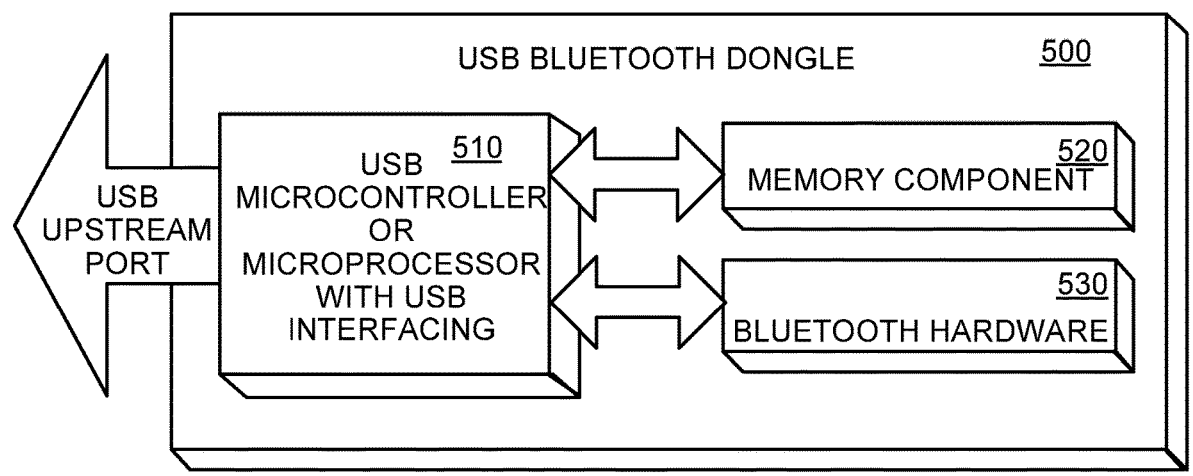
FIG. 5 is a block diagram of a USB peripheral having multiple functionalities.

As another configuration, FIG. 5 is a block diagram of a USB peripheral 500 having multiple functionalities. In this implementation, USB peripheral 500 includes an internal microprocessor with USB interfacing 510, or alternatively a USB microcontroller, that communicates with a memory component 520 and wireless (e.g., Bluetooth) networking hardware 530. As a result, USB peripheral 500 is capable of operating as a wireless (e.g., Bluetooth) networking device or "dongle" and as USB flash drive, both of which are accessible with autorun functionality In one configuration, the microprocessor 510 has USB interfacing ability. It is coupled with a memory component 520 and Bluetooth radio component 530. Microprocessor 510 implements client layers of the Bluetooth stack. The firmware that the microprocessor 510 executes is stored in memory component 520. The autorun firmware can also be additionally stored as a part of the functionality of existing firmware or separately in the memory component 520. In another configuration, the microprocessor 510 may not directly have USB interfacing capability and could use a separate USB microcontroller (not shown).

A feature of including autorun firmware in USB peripherals is that software applications can be bundled with the USB peripherals. The bundled software application may or may not utilize the USB peripheral.

Figure 6:
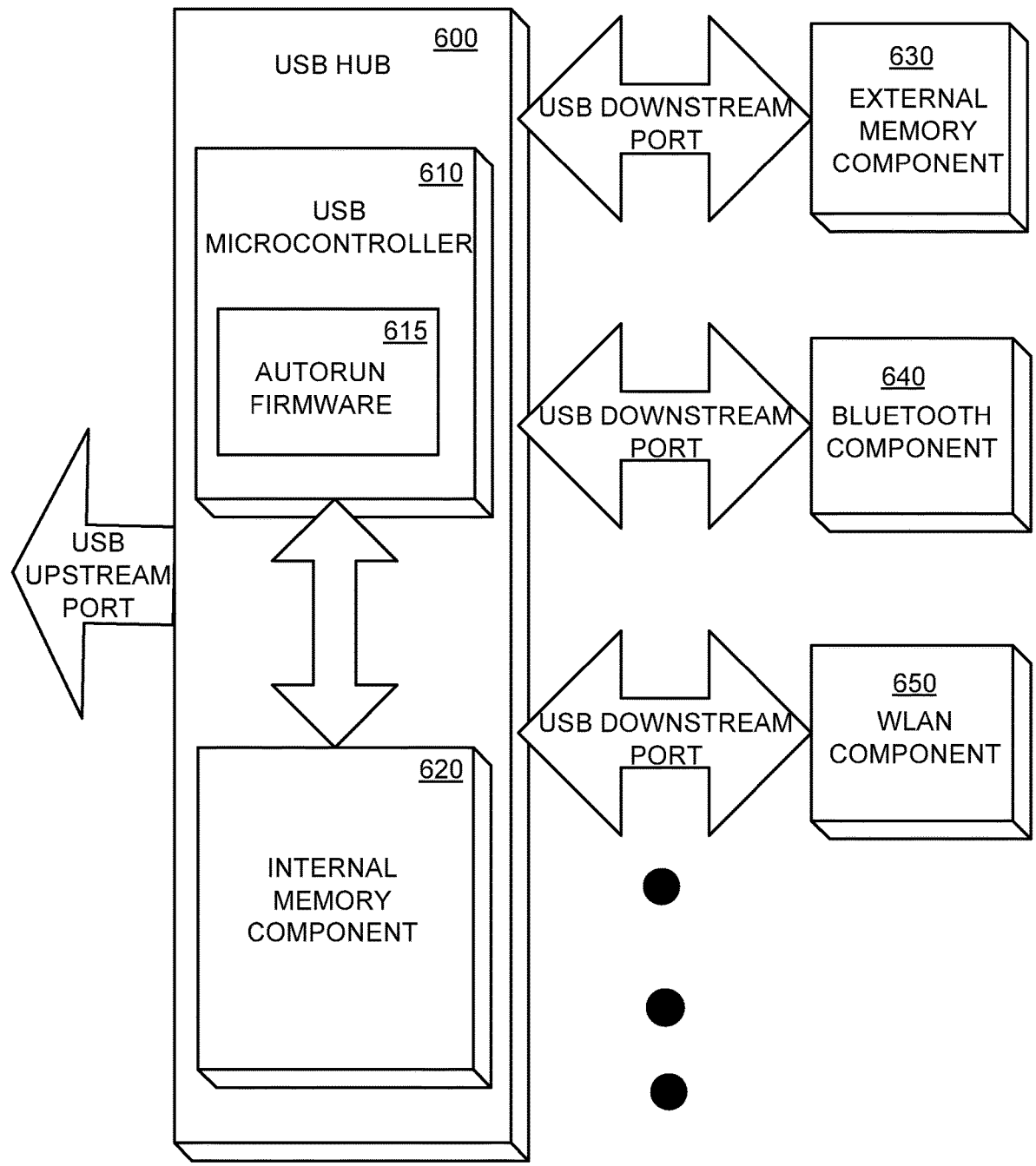
FIG. 6 is a block diagram of a USB hub with autorun firmware and access to multiple distinct functionalities.

As an example, FIG. 6 is a block diagram of a USB hub 600 that includes a USB microcontroller 610 with autorun firmware 615 and access to one or multiple distinct functionalities or USB peripherals, such as an external memory component 630, a Bluetooth networking component 640, or a WLAN component 650. Such USB peripherals 630-650 could be formed in combination with USB hub 600. USB hub 600 may be externally connected with one or more of these components 630-650, as illustrated, or alternatively one or more of the components 630-650 can be internally integrated to form a USB peripheral or device with multiple distinct functionalities.

There could be multiple executions of autorun firmware from each or some of these peripherals. Thus the autorun firmware allows for distribution of software (e.g. device drivers, synchronization software, etc.) that can be autorun along with any USB peripheral.

The implementation options also include mechanisms for allowing the autorun feature to be enabled or disabled by an external mechanism (e.g., switch) that is included on the device or peripheral. The switch could be manually operable by a person. The switch could be a simple two-mode (e.g., autorun on/off) switch or could be a switch that selects from among more than two modes.

Figure 7:
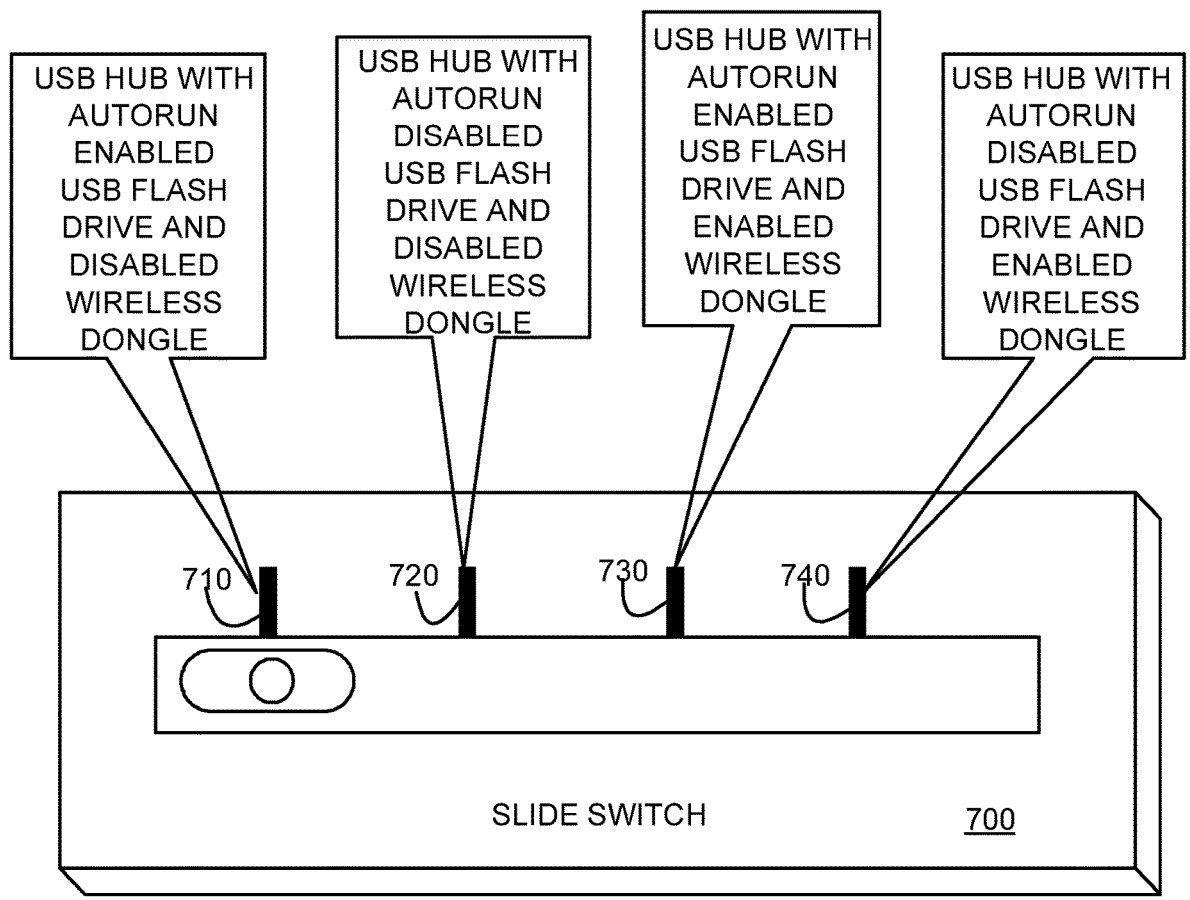
FIG. 7 is a schematic diagram of a person-operable physical slide switch.

FIG. 7 is a schematic diagram of a person-operable physical slide switch 700 that allows a person to select from among multiple modes, functionalities, or peripherals available on a USB device or "dongle." As an example, switch 700 relates to features or peripherals available from USB hub 600 of FIG. 6, including external memory component 630, and wireless dongle or module (640 or 650) for adding wireless (e.g. Bluetooth, WiFi, IrDA) interface to its host PC.

In this exemplary illustration, switch 700 has 4 user-selectable positions. In position 710, autorun functionality is enabled, and the wireless components are disabled. In position 720, autorun functionality is disabled, and the wireless is components are disabled. In position 730, autorun functionality is enabled, and the wireless components are enabled. In position 740, autorun functionality is disabled, and the wireless components are enabled.

The autorun firmware enables the distribution of software that can be autorun from a memory component. There is also a unique security mechanism that can be incorporated to protect the software that is installable or executable from the memory component by the autorun firmware.

A section of the internal memory component (e.g., memory component 620, FIG. 6) may be protected from public access by password protecting it or by physical security means such as a lock, among other means. The flash memory component can also be segmented into public and private sections. Private sections can be used to store installable data or executable software that cannot be viewed or accessed by the user, and public sections can be viewed or accessed by users in a conventional manner. The installable data or executable software being distributed through the memory component can be stored in the protected region of the memory component. Security by way of copy protection of this installable data or executable software can be achieved by allowing only an application launcher executable, which is autorun from the memory component, to access the installable data or executable software.

In one implementation, the application launcher executable has the following characteristics: it is autorun from the memory component, and it has access to the protected or private region of the memory component. This access is gained by authenticating itself to the memory controller (e.g. USB microcontroller) and/or to the installable software in the protected region of the memory component. The authentication mechanism may be a password-based mechanism or a more involved cryptographic algorithm. Among the various techniques used for authentication are digital signatures and unique identifiers like the Bluetooth Device Address, MAC address, etc. The application launcher executable may authenticate itself directly to the memory controller software and/or installable software or to a separate authentication software that resides in the protected region of the memory component.

The application launcher executable may be built generically to execute any or all executables and installables that exist within the protected region of the memory component. Alternatively, the application launcher executable may be programmed to launch a particular executable or installable from the protected region. Considering the possibility of the memory component being segmented into "n" protected sections where n is greater than 1, the application launcher executable may access one or more of these sections in the mechanism described herein. The protected memory region may contain, for example, executable software (also called an application executable), or installable software (also called an application installable), or protected data.

Figure 8:
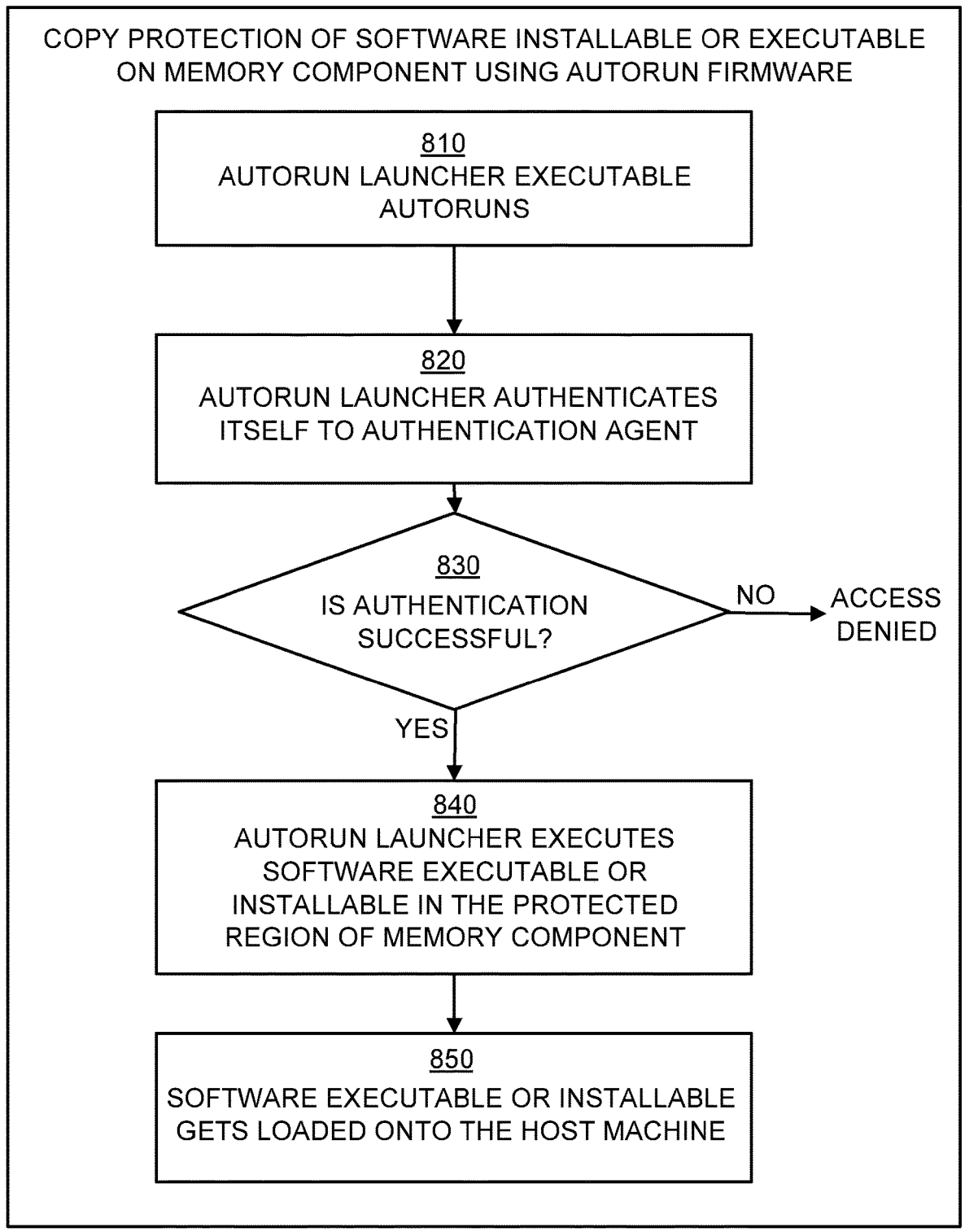
FIG. 8 is a flow diagram of a software-implemented copy protection method.

FIG. 8 is a flow diagram of a software-implemented copy protection method for protecting of software that is executable or installable on using autorun firmware.

In step 810, an application launcher executable that is stored in a memory component of an IC memory device is run automatically on a host computer by an autorun firmware stored on the IC memory device. The autorun firmware operates automatically upon activation of the IC memory device, such as occurs when the memory device is plugged into a port or socket of the host computer.

In step 820, the application launcher authenticates itself to authentication agent software that resides in the protected region of the memory component. The authentication agent software may be incorporated within the software executable or installable that is being protected or may be a separate application. The authentication algorithm may be password based or may involve cryptographic techniques.

Step 830 is a query whether the authentication is successful. If not, access to the protected executable or installable is denied. If authentication is successful, step 830 proceeds to step 840 and the application launcher executable gains access to the protected memory region.

In step 840, the application launcher executable executes the application executable or installable that is stored in the protected region of the memory component. The application launcher executable may also be programmed to execute any or all executables and installables that exist within the protected region of the memory component.

In step 850, the executables and installables thus launched are executed on the host computer.

Figure 9:
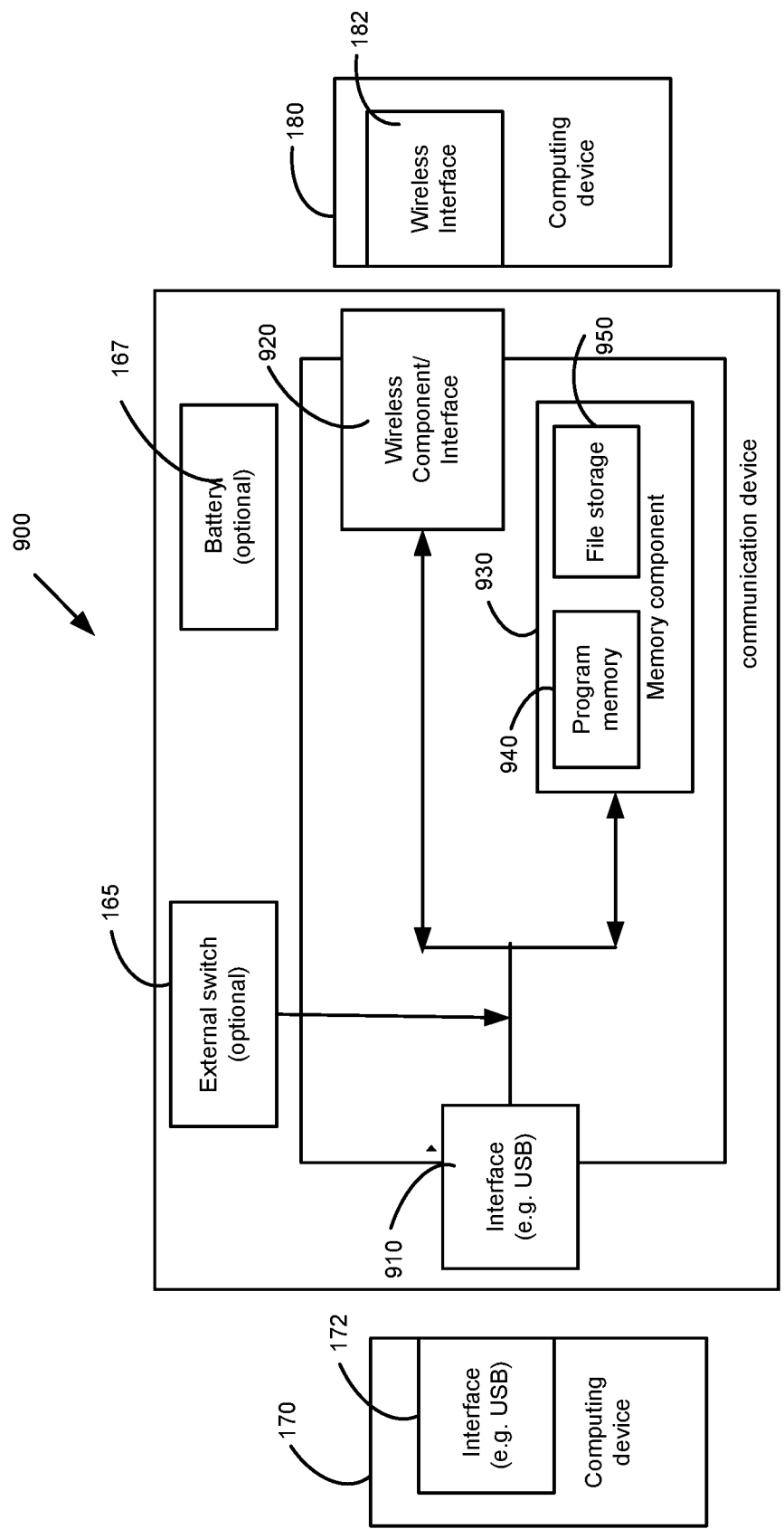
FIGS. 9-13 are block diagrams of embodiments of a communication device of the present invention.

FIG. 9 is a block diagram of one embodiment of a communication device 900 of the present invention. The communication device 900 includes a structural interface 910, such as a USB (universal serial bus) interface, and a wireless component interface 920. Interface 910 can be any structural interface including, but not limited, to USB, FireWire (IEEE 1394), CF (compact flash), SD (secure digital), parallel, serial, among others, that enables device 900 to plug into a computing device 170. The wireless interface 920 may be implemented using any wireless medium such as infrared or radio communication according to any protocol including but not limited to Bluetooth®, IEEE 802.11a, IEEE 802.11b (WiFi), IEEE 802.11ab, IEEE 802.11g, IEEE 802.11f, IEEE 802.15, IEEE 802.17, Zig-Bee® among others.

The communication device 900 includes a memory component 930 that may include volatile memory (e.g., ROM, RAM) and/or non-volatile memory (e.g., flash memory, hard disk). One or more software components or applications (not shown) may be stored in the memory component 930. The software components or applications stored in the memory component 930 may include programs or functionalities that enable device 900 to "auto run" or "auto play" so that, when the communication device 900 is connected with interface 910 to a computing device 170, the program or software application will be automatically installed, launched and executed in the computing device 170, as will be described in detail below. The memory component 930 may include a program memory segment 940 and an optional separate file memory segment 950. Programs or software applications can be stored or embedded in the program memory 940. The software programs or applications may or may not be viewed or edited (e.g., added, deleted or changed) by a user. Hence program memory segment 940 can be implemented as a private or secure section of the memory component 930.

As an optional feature, file memory segment 950 may provide for additional file or data storage, run time buffering of data, or caching of data and files for faster access. The file storage component 950 is an example of an implementation of such memory segmentation. This component 950 may be optional and may or may not exist depending on implementation. Files and data stored in the file storage memory component 950 typically can be saved, retrieved, viewed or edited by a user through a computing device. As an example, the communication device 900 can be used as an external disk drive (e.g., "Flash drive") that a user can access and use as separate data storage drive when device 900 is plugged into the computing device 170.

The communication device 900 may include an optional external control switch 165, which can be used to activate, deactivate, control or adjust one or more functions provided by the device. The communication device 900 may also include an interface or status indicator (not shown) such as an LCD displaying text or image, lights or sound for status indication.

As is known in the art, wireless interface 920 may include a radio, a baseband controller and separate internal memory (not shown). The separate internal memory, implemented with Flash, RAM and or ROM circuitry, can store instructions and data required for proper functioning of the wireless component 920, such as a wireless protocol stack. Wireless component interface 920 may include an internal processor (not shown) that implements the instructions and logic for complying with wireless protocols (e.g. Bluetooth or IEEE 80211, a,b,g,f, among others), in addition to managing the radio and the baseband of the wireless component interface 920.

Computing device 170 (e.g. PC, laptop, server) includes at least one structural interface 172 to which interface 910 of communication device 900 is connectable. In a typical implementation, structural interface 172 is a USB interface, however other interfaces such as parallel, serial, Firewire (IEEE 1394 a, 1394 b), CF (compact flash), SD (secure digital), Ethernet or wireless interfaces can also be implemented. To simplify the following description of the invention, interfaces 910 and 172 will be referred to a USB interfaces. It will be appreciated, however, that interfaces 910 and 172 could alternatively be implemented with any other interface format.

A computing device 180 (e.g., PC, laptop, server, PDAs such as pocket PC, Palm, Symbian, Java or Linux cell phones, digital cameras, etc.) includes a wireless interface 182. The communication device 900 can communicate with the computing device 180 via wireless interface 920. Examples of wireless interface 920 that can be implemented include Bluetooth, IrDa, ZigBee, IEEE802.11 A, B, F and G, among others.

Figure 10:
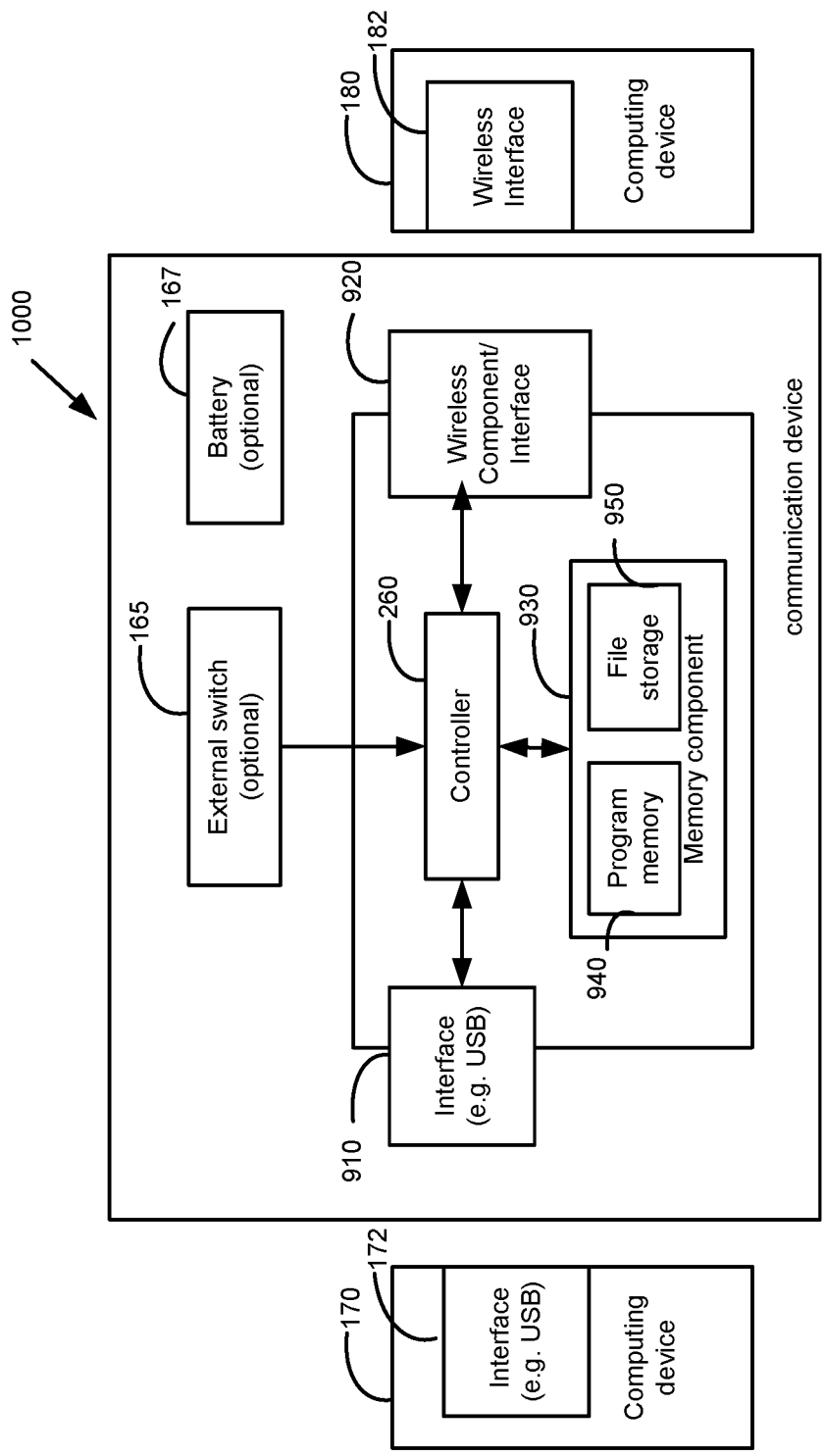

FIG. 10 is a block diagram of another embodiment of a communication device 1000 of the present invention. Elements of the communication device 1000 that are common to or the same as elements of communication device 900 are indicated by the same reference numerals. In addition, the communication device 1000 includes a controller 260, which may comprise a microprocessor. Other implementations of the controller 260 are and may include a digital signal processor (DSP), a system-on-a-chip (SOC), Field Programmable Gate Arrays FPGL, Application-Specific Integrated Circuit etc. In this implementation, the memory component 930 may also store programs to be executed by the controller 260. Examples of functionality and components operable by controller 160 may include any combination below and are not limited to:

- A communication protocol stack component (e.g., USB interface or Bluetooth stack, data or format conversion).
- Communication and or security management software (e.g., protocol encoding/decoding, encryption/decryption, and authentication).
- Control modules and components for managing the radio and baseband component of wireless interface 920.
- AutoRun components that provide and control automatic installation and launching on the computing device 170 of one or more programs stored in 940 when the device 900 is plugged into computing device 170.
- Control and management of the structural interface 910 (e.g. USB, FireWire etc)

The controller 260 may or may not include an operating system. An advantage of the implementation of communication device 1000 in FIG. 10 is that it may have a reduced chip count or hardware component cost compared to some implementations. For example, the functionalities of multiple components of a communication device of this invention may be implemented and managed with a single processor in the controller 260, rather than employing multiple controller/processor implementations.

Figure 11:
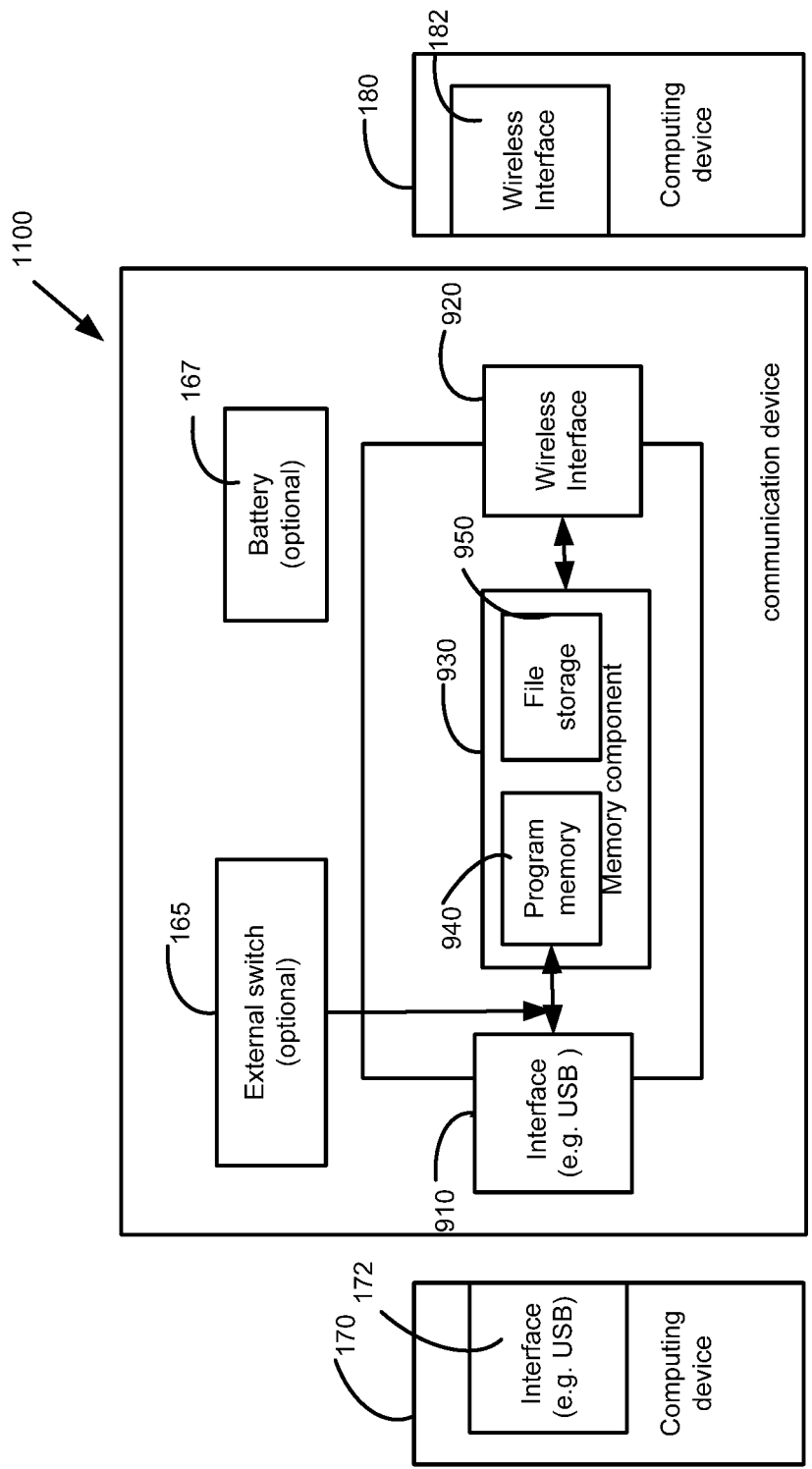

FIG. 11 is a block diagram of another embodiment of a communication device 1100 of the present invention. Elements of the communication device 1100 that are common to or the same as elements of communication device 900 are indicated by the same reference numerals. In FIG. 11, the memory component 930 acts and may include a hub for the wireless interface 920. Memory component 930 may include a controller or processor (not shown). In FIG. 9, the wireless interface 920 and memory component 930 are connected to the USB interface 910.

As discussed, memory component 940 can be implemented depending on the application. All above features and requirements can be implemented in a single memory component 930, segmented into two components 940 and 950, or segmented into three components 144, 146, and 950 as illustrated in FIGS. 12 and 13.

FIGS. 9-11 show memory component 930 segmented into two sections, private section or program section 940 and public section or file storage section 950. The public file storage component 950 corresponds to memory that can be accessed by the end-user. This optional component 950 allows a user to save and retrieve data when device 900 is plugged into the USB interface of computing device 170. This public memory section 950 (e.g., flash) can also be exposed for public wireless access. Program memory section 940 is private and an end user cannot access it.

Figure 12:
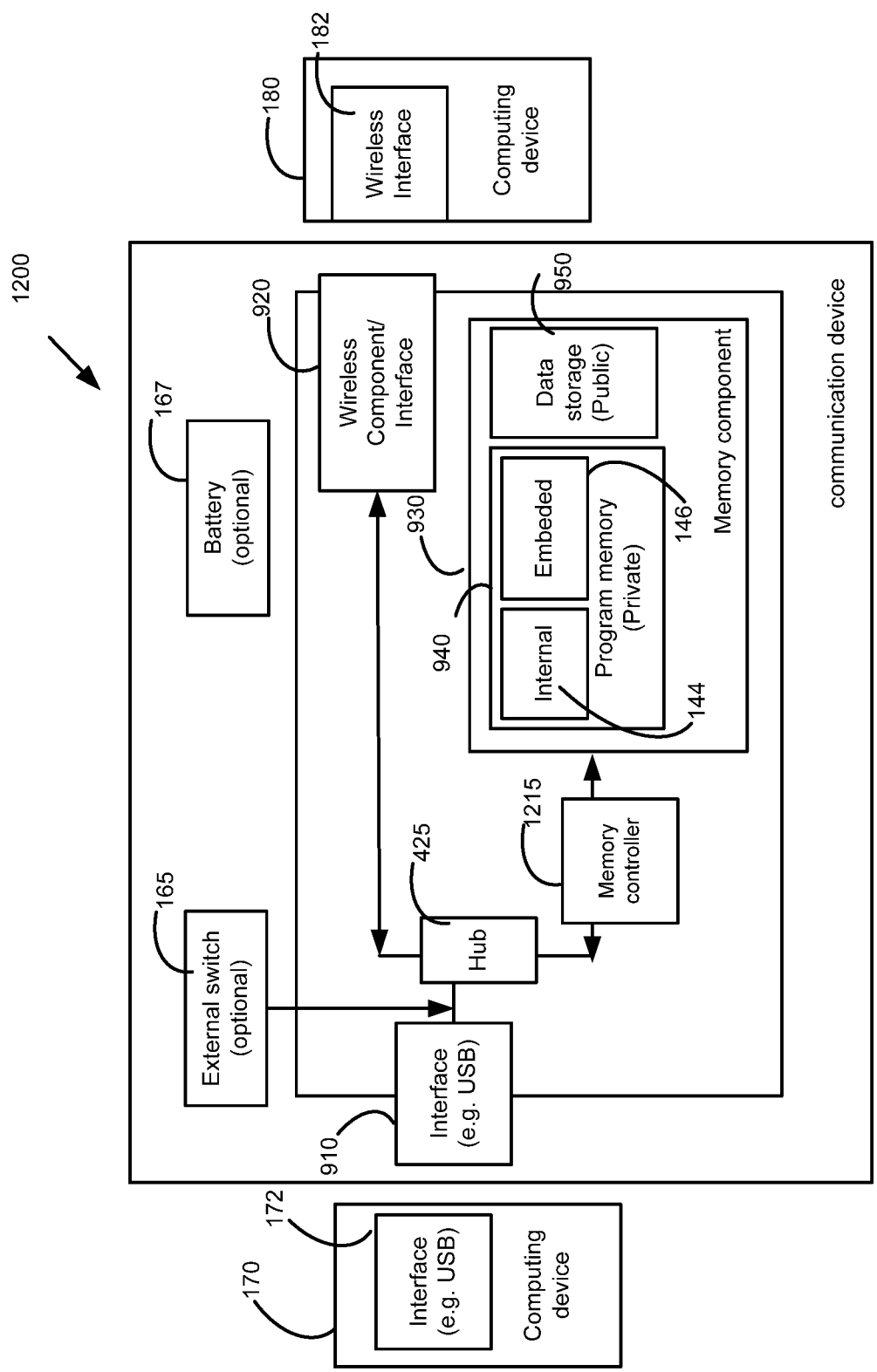
Figure 13:
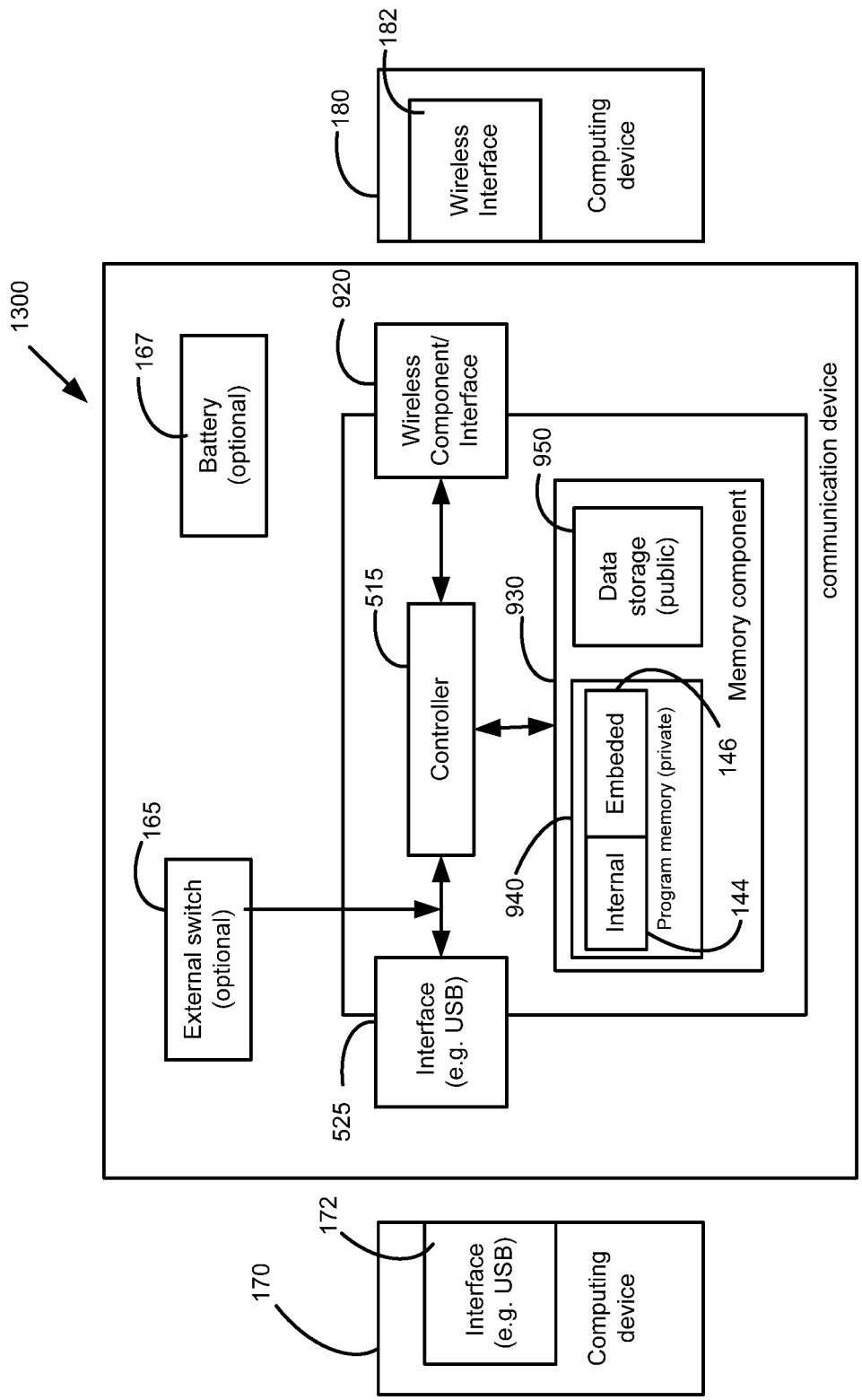

FIGS. 12 and 13 illustrate as additional implementations respective communication devices 1200 and 1300 of the present invention. Elements of the communication devices 1200 and 1300 that are common to or the same as elements of communication device 900 are indicated by the same reference numerals. A data output process (e.g. output or printing of digital document or display or presentation of digital content) may be executed using the system configuration as shown in FIGS. 12 and 13.

In communication devices 1200 and 1300 private memory component 940 is segmented into two sections: internal section 144 and embedded section 146. Internal memory section 144 can store data and programs required for proper functioning of the communication device 900. These programs and data can be accessed by a memory controller 1215 [or 515 in FIG. 13] and support its functionalities. Embedded memory section 146 can store programs, applications, and data that will be installed or launched on computing device 170 when communication device 900 is plugged into computing device 170. The software program or applications typically may not be viewed or edited (e.g., added, deleted or changed) by a user and are embedded during the manufacture of devices 1200 and 1300.

Memory controller 1215 [or 515 in FIG. 13] manages communication with the structural external interface 910 [or 525 in FIG. 13] (e.g., USB, FireWire, etc.) and memory component 930. Memory controller 1215 [or 515 in FIG. 13] can be implemented with a microprocessor, DSP, ASIC, etc and may include internal memory for running its program. Additional memory such as those provided by internal memory section 144 can also be implemented if needed. Examples of the functionality and software components that may be implemented with the memory controller 1215 [or 515 in FIG. 13] include "auto run" or "auto play" functionalities, segmentation of memory 930, data security, and USB interfacing functionalities, among others.

Communication device 1200 includes a hub component 425 (e.g., a chip), which combines the components of wireless interface block 920 with the memory component block 930 and its memory controller 1215 [or 515 in FIG. 13]. The hub 425 enables sharing of the same external structural interface 910 [or 525 in FIG. 13] (e.g., USB, FireWire) between wireless component 920, memory controller 1215 [or 515 in FIG. 13] and memory component 930.

Each of FIGS. 9-13 illustrates an optional battery 167 being included in the respective communication devices 900-1300. Optional battery 167 enables each of communication devices 900-1300 to receive or send data wirelessly without being plugged into a computing device 170. Typically, each communication device 900-1300 draws its operating power computing device 170 when plugged into its interface 172 (e.g., USB).

Communication devices 900-1300 of the present invention provide users of mobile devices 180 (e.g., wireless enabled digital camera, mobile phone, etc.) data storage that is integral with the wireless communication and may be independent of computing device 170. In accordance with the present invention, each of communication devices 900-1300 can be configured to communicate in a point-to-point manner with a wireless-enabled mobile device 180 (e.g., a Bluetooth digital camera, phone etc). An embedded application (not shown) stored on each wireless device 900-1300 can manage the communication with an embedded application in the mobile device 180.

Figure 14:
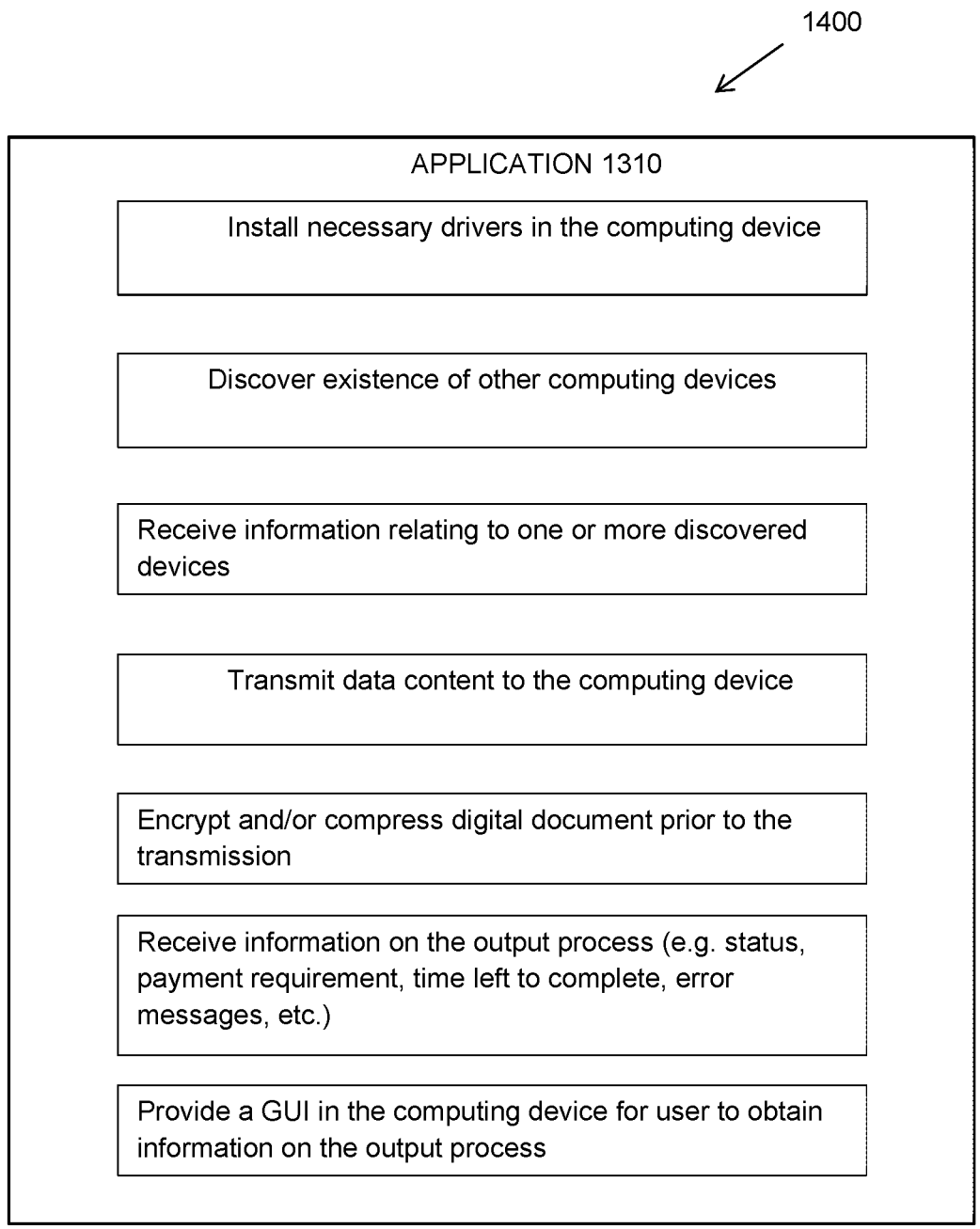
FIG. 14 is a block diagram 1400 that illustrates the exemplary features of an application of the present invention after the application is launched in the computing device.

An application 1310 is stored or embedded in the memory component 930 of the communication device 900-1300. The application 1310 may be launched and executed in the computing device 170 once the device 900-1300 is connected to or plugged into computing device 170. In this particular example and as shown at 1400 in FIG. 14, the application 1310, after being launched in the computing device 170, may include but is not limited to any combination of the features below:

1. Install necessary one or more drivers, one or more applications, and/or one or more wireless communication stacks in the computing device;
2. Discover existence of other computing devices;
3. Receive information relating to the one or more discovered devices (e.g. name, id, availability, type of service, service or communication options, quality of service, price etc.);
4. Transmit data content to the computing device;
5. Encrypt and/or compress the digital document prior to the transmission;
6. Receive information on an output process (e.g. status, payment requirement, time left to complete, error messages, etc.) from the application; and
7. Provide a GUI in the computing device. The GUI allows the user to select one or more computing devices for communication from a list of discovered computing devices available. Further, the user may select one or more output devices, from a list of available output devices, that are connected to the selected computing device. The GUI may further include means for user to obtain information on the output process and/or give instruction to the output process. For example, this may include providing payment information, status information. The GUI may further allow for controlling the functionality of the application such as initiating, pausing, or canceling the process.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. An integrated circuit memory device for transmitting protected data stored in the integrated circuit memory device to a wireless computing device, the integrated circuit memory device comprising:
   a graphical user interface;

a wireless interface, which includes a radio component, for establishing a local point-to-point wireless communication connection with the wireless computing device, the local point-to-point wireless communication connection being a radio communication connection;

a memory controller;

a memory component;

a protected memory area in the memory component storing the protected data, wherein the protected data stored in the protected memory area is implemented to be inaccessible, at the protected memory area, by a user of the integrated circuit memory device, but is implemented to be accessible by the memory controller, wherein the protected data includes data or software;

an internal memory area in the memory component storing a program, wherein the program stored in the internal memory area is implemented to be inaccessible at the internal memory area by the user, but is implemented to be accessible and executable by the memory controller to support at least part of functionalities of the memory controller;

wherein the integrated circuit memory device is configured for:

establishing, by the wireless interface of the integrated circuit memory device, the local point-to-point wireless communication connection between the integrated circuit memory device and the wireless computing device, the local point-to-point wireless communication connection being a radio communication connection;

accessing, by the memory controller, the protected data stored in the protected memory area;

operating, by the memory controller, at least part of an authentication algorithm for accessing the protected data stored in the protected memory area;

operating, by the memory controller, at least part of an encryption operation on the protected data for wireless transmission;

wirelessly transmitting the encrypted protected data from the integrated circuit memory device over the local point-to-point wireless communication connection to the wireless computing device;

wirelessly receiving information, via the wireless interface of the integrated circuit memory device, over the local point-to-point wireless communication connection, from the wireless computing device, in response to the integrated circuit memory device having wirelessly transmitted the encrypted protected data to the wireless computing device over the local point-to-point wireless communication; and displaying, on the graphical user interface, at the integrated circuit memory device, and to the user of the integrated circuit memory device, the information that is wirelessly received from the wireless computing device;

wherein the integrated circuit memory device provides protection of the protected data by storing the protected data in the protected memory area and requiring use of the integrated circuit memory device for wirelessly transmitting the encrypted protected data stored in the protected memory area.

2. The integrated circuit memory device of claim 1, wherein the protecting of the protected data includes storing the protected data in the protected memory area of the integrated circuit memory device, using a decryption operation, using the encryption operation, and using the wireless transmission over the local point-to-point wireless communication connection.

3. The integrated circuit memory device of claim 1, wherein the integrated circuit memory device is included in at least one of a smart card, a dongle, a USB memory device, or a wireless communication device.

4. The integrated circuit memory device of claim 3, wherein the integrated circuit memory device is a wireless communication device, and wherein the wireless communication device further includes the graphical user interface, and wherein the integrated circuit memory device is further configured for, prior to establishing the local point-to-point wireless communication connection between the integrated circuit memory device and the wireless computing device, obtaining, via the graphical user interface, authentication information for establishing the local point-to-point wireless communication connection between the integrated circuit memory device and the wireless computing device, wherein the authentication information includes a password, a personal identification number (PIN), or biometric information, individually or in combination.

5. The integrated circuit memory device of claim 1, wherein the integrated circuit memory device is further configured for discovering the wireless computing device for establishing the local point-to-point wireless communication connection.

6. The integrated circuit memory device of claim 1, further comprising a structural interface for connecting the integrated circuit memory device to a reader or a computing device, wherein the integrated circuit memory device is further configured for transmitting the encrypted protected data from the integrated circuit memory device, over the structural interface and via a structural connection, to the reader or the computing device.

7. A method for wirelessly transmitting protected data stored in an integrated circuit memory device to a wireless computing device, the integrated circuit memory device having:

a graphical user interface;

a wireless interface, which includes a radio component, for establishing a local point-to-point wireless communication connection with the wireless computing device, the local point-to-point wireless communication connection being a radio communication connection;

a controller;

a memory component;

a protected memory area in the memory component storing protected data, wherein the protected data stored in the protected memory area is implemented to be inaccessible at the protected memory area by a user of the integrated circuit memory device, but is implemented to be accessible by the controller, wherein the protected data includes data or software; and an internal memory area in the memory component storing a program, wherein the program stored in the internal memory area is implemented to be inaccessible, at the internal memory area, by the user, but is implemented to be accessible and executable by the controller to support at least part of functionalities of the controller;

the method comprising:

establishing, using the wireless interface of the integrated circuit memory device, the local point-to-point wireless communication connection between the integrated circuit memory device and the wireless computing device, the local point-to-point wireless communication connection being a radio communication connection;

enabling, by the integrated circuit memory device, at least part of operations of the integrated circuit memory device subsequent to establishing the local point-to-point wireless communication connection;

accessing, by the controller, the protected data stored in the protected memory area;

operating, by the controller, at least part of an encryption operation on the protected data for encrypting the protected data for wireless transmission;

wirelessly transmitting the encrypted protected data from the integrated circuit memory device, over the local point-to-point wireless communication connection, to the wireless computing device;

wirelessly receiving, via the wireless interface, at the integrated circuit memory device, and over the local point-to-point wireless communication connection, information from the wireless computing device, in response to the integrated circuit memory device having wirelessly transmitted the encrypted protected data, over the local point-to-point wireless communication connection, to the wireless computing device; and displaying, on the graphical user interface, at the integrated circuit memory device, and to the user of the integrated circuit memory device, the information that is wirelessly received from the wireless computing device, wherein the integrated circuit memory device provides protection of the protected data by storing the protected data in the protected memory area of the integrated circuit memory device, by the encryption operation, and by the wireless transmission over the local point-to-point wireless communication connection.

8. The method of claim 7, further comprising operating, by the controller, at least part of an authentication algorithm for the controller to access the protected data stored in the protected memory area.

9. The method of claim 7, wherein security of the protected data includes storing the protected data in the protected memory area of the integrated circuit memory device, and wherein the security is safeguarded, at least in part, by the storing of the protected data in the protected memory area of the integrated circuit memory device, by a decryption operation, by the encryption operation, and by the wireless transmission over the local point-to-point wireless communication connection.

10. The method of claim 7, wherein the integrated circuit memory device is included in, or embodied as, a smart card, a dongle, a USB memory device, or a wireless communication device.

11. The method of claim 7, in which the integrated circuit memory device is embodied as a smart card, and the wireless computing device is at least a reader.

12. The method of claim 7, in which the integrated circuit memory device functions as a security key by storing the program in the internal memory area, wherein the program in the internal memory area is implemented to be inaccessible at the internal memory area by the user, but is implemented to be accessible and executable by the controller, wherein the program provides at least part of the operations of the controller, wherein the at least part of the operations includes accessing the protected data stored in the protected memory area of the integrated circuit memory device.

13. The method of claim 7, in which the integrated circuit memory device is a wireless communication device that includes the graphical user interface, and wherein the method further comprises, prior to establishing the local point-to-point wireless communication connection between the integrated circuit memory device and the wireless computing device, obtaining, via the graphical user interface, authentication information for establishing the local point-to-point wireless communication connection between the integrated circuit memory device and the wireless computing device, wherein the authentication information includes a password, a personal identification number (PIN), or biometric information, individually or in combination.

14. The method of claim 7, wherein the integrated circuit memory device further includes a structural interface for connecting the integrated circuit memory device to a reader, a socket, or a port of a computing device, and wherein the method further comprises transmitting the encrypted protected data, from the integrated circuit memory device over the structural interface and via a structural connection, to the wireless computing device.

15. A wireless communication device that includes an integrated circuit memory device for storing protected data and a wireless component for transmitting the protected data to a wireless computing device, the wireless communication device comprising:

a graphical user interface;

a wireless interface, which includes a radio component, for establishing a local point-to-point wireless communication connection with the wireless computing device, the local point-to-point wireless communication connection being a radio communication connection;

a memory controller;

a memory component;

a protected memory area in the memory component storing the protected data, wherein the protected data stored in the protected memory area is implemented to be inaccessible, at the protected memory area, by a user of the wireless communication device at the protected memory area, but is implemented to be accessible by the memory controller, wherein the protected data includes data or software; and an internal memory area in the memory component storing a program, wherein the program is implemented to be inaccessible, at the internal memory area, by the user but is implemented to be accessible and executable by the memory controller to support at least part of functionalities of the memory controller;

wherein operations of the wireless communication device include:

establishing, by the wireless communication device, the local point-to-point wireless communication connection between the wireless communication device and the wireless computing device, the establishing of the local point-to-point wireless communication connection using the wireless interface of the wireless communication device, the local point-to-point wireless communication connection being a radio communication connection;

enabling, by the wireless communication device, at least part of the operations of the wireless communication device, subsequent to establishing the local point-to-point wireless communication connection;

executing, by the memory controller, the program stored in the internal memory area, and wherein the execution of the program, by the memory controller, causes the memory controller:
- to access the protected data stored in the protected memory area, the accessing of the protected data stored in the protected memory area includes an authentication algorithm, and
- to encrypt the accessed protected data for wireless transmission; wirelessly transmitting the encrypted protected data from the wireless communication device, over the local point-to-point wireless communication connection, to the wireless computing device;

wirelessly receiving information, at the wireless communication device, over the local point-to-point wireless communication connection, from the wireless computing device, in response to the wireless communication device having wirelessly transmitted the encrypted protected data to the wireless computing device; and displaying, on the graphical user interface, at the wireless communication device, and to the user of the wireless communication device, the information that is wirelessly received from the wireless computing device, wherein the wireless communication device provides protection of the protected data by storing the protected data in the protected memory area and requiring use of the wireless communication device for the wireless transmission of the encrypted protected data.

16. The wireless communication device of claim 15, wherein the operations of the wireless communication device further comprise providing, by the wireless communication device to the wireless computing device, identification information associated with a device interface description.

17. The wireless communication device of claim 15, wherein security of the protected data includes storing the protected data in the protected memory area of the integrated circuit memory device, and wherein the security of the protected data is safeguarded, at least partly, (i) by the storing of the protected data in the protected memory area of the wireless communication device, (ii) by the encryption of the accessed protected data for the wireless transmission, and (iii) by the wireless transmission over the local point-to-point wireless communication connection.

18. The wireless communication device of claim 15, wherein the integrated circuit memory device is included in at least one of a smart card, a dongle, or a USB memory device.

19. The wireless communication device of claim 15, further comprising a structural interface for connecting the integrated circuit memory device to a reader or a computing system.

20. The wireless communication device of claim 19, wherein the operations of the wireless communication device further comprise:
- transmitting the protected data, from the integrated circuit memory device over the structural interface and via a structural connection, to the reader or the computing system.

* * * * *